(12) United States Patent
Sasaki

(10) Patent No.: US 6,892,442 B2
(45) Date of Patent: May 17, 2005

(54) METHOD OF MANUFACTURING A THIN-FILM MAGNETIC HEAD

(75) Inventor: Yoshitaka Sasaki, Yokohama (JP)

(73) Assignee: TDK Corporation, Tokyo (JP)

( * ) Notice: Subject to any disclaimer, the term of this patent is extended or adjusted under 35 U.S.C. 154(b) by 526 days.

(21) Appl. No.: 10/101,853

(22) Filed: Mar. 21, 2002

(65) Prior Publication Data

US 2002/0095766 A1 Jul. 25, 2002

Related U.S. Application Data

(62) Division of application No. 09/184,284, filed on Nov. 2, 1998, now Pat. No. 6,385,012.

(30) Foreign Application Priority Data

Oct. 2, 1998 (JP) .......................................... 10-281704

(51) Int. Cl.⁷ .......................... G11B 5/127; H04R 31/00
(52) U.S. Cl. ................................ 29/603.07; 29/603.13; 29/603.14; 29/603.15; 29/603.16; 29/603.18; 29/846; 360/122; 360/126; 360/317; 360/234.5; 360/234.7; 360/245.8; 360/245.9; 427/127; 427/128
(58) Field of Search ............ 29/603.07, 603.13–603.16, 29/603.18; 360/121, 122, 126, 317, 234.5, 234.7, 245.8, 245.9; 427/127, 128

(56) References Cited

U.S. PATENT DOCUMENTS 5,146,379 A * 9/1992 Iwata et al. ................ 360/126
5,694,677 A * 12/1997 Tsunoda .................. 29/603.12
5,798,890 A    8/1998 Fontana, Jr. et al. ..... 360/234.5
5,896,249 A    4/1999 Fontana, Jr. et al. ..... 360/234.5
6,198,600 B1 * 3/2001 Kitao et al. .............. 360/235.2

FOREIGN PATENT DOCUMENTS

| JP | A-61-296518 | 12/1986 | |
| JP | A-3-95715 | 4/1991 | |
| JP | 04082005 A * | 3/1992 | ............ G11B/5/31 |
| JP | A-6-203330 | 7/1994 | |
| JP | A-8-87848 | 4/1996 | |

OTHER PUBLICATIONS

"Floating thin film head fabricated by ion etching method"; Nakanishi, T.; Kogure, K.; Toshima, T.; Yanagisawa, K.; Magnetics, IEEE Transactions on , vol.: 16 , Issue: 5 , Sep. 1980; pp.: 785–787.*

* cited by examiner

Primary Examiner—Paul Kim
(74) Attorney, Agent, or Firm—Oliff & Berridge, PLC

(57) ABSTRACT

The invention allows a thin-film magnetic head that meets specifications required by the customer to be provided in a short period of time and manufacturing costs to be reduced. A slider includes a first surface and a second surface each facing opposite directions. Two magnetic head element portions are formed in the slider near an end face orthogonal to the direction of air flow. One of the element portions is placed to face the first surface. The other element portion is placed to face the second surface. The element portions are placed in symmetrical positions with respect to a place parallel to the first and second surfaces. On the end face four pad-shaped electrodes are provided for electrically connecting the two element portions to an external device. The electrodes are selectively connected to any of the element portions through four conductors.

16 Claims, 23 Drawing Sheets

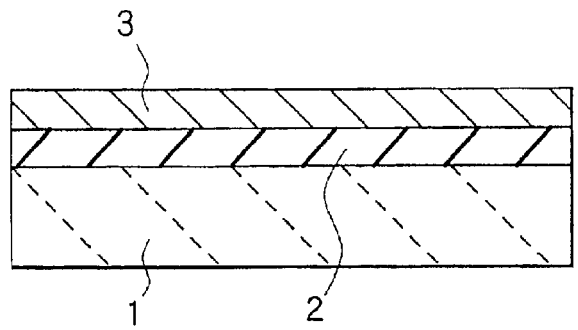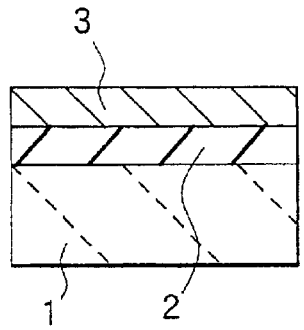
FIG.1A  FIG.1B
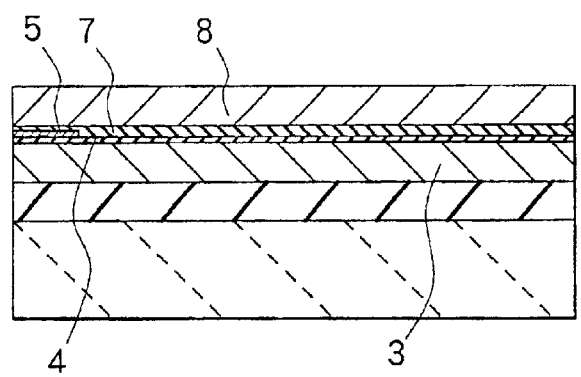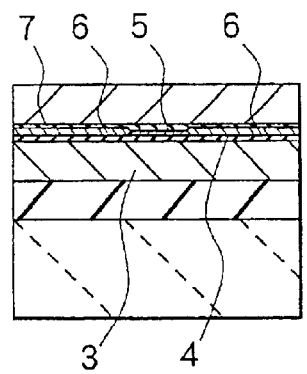
FIG.2A  FIG.2B
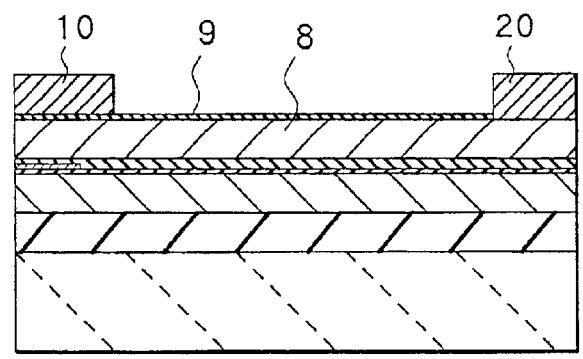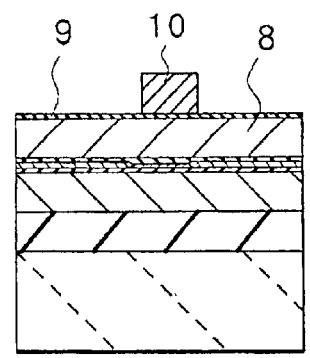
FIG.3A  FIG.3B

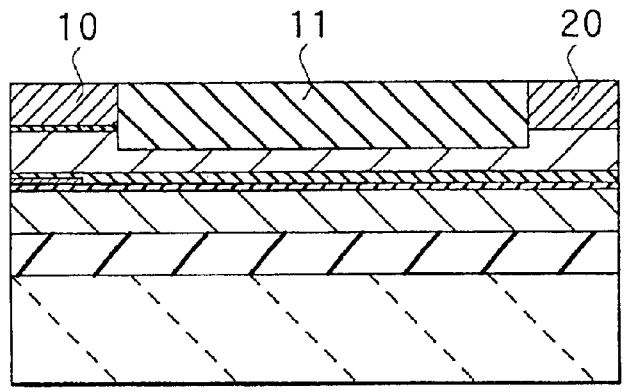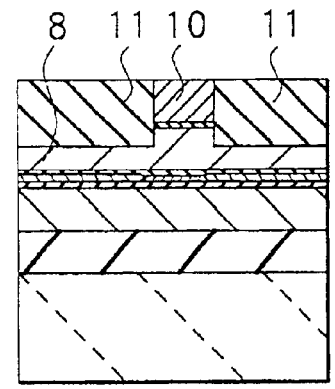
FIG.4A  FIG.4B
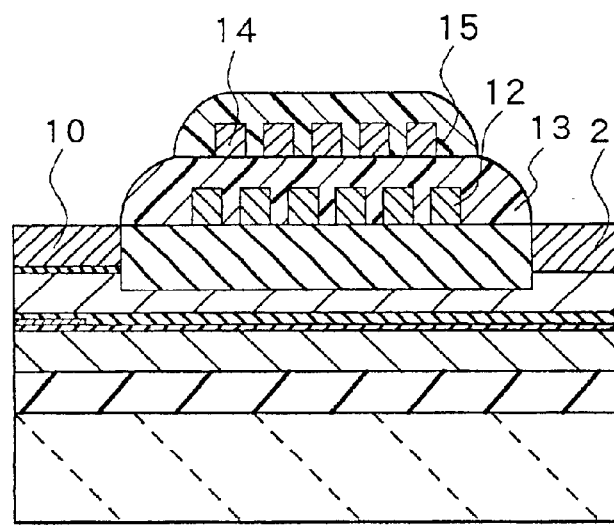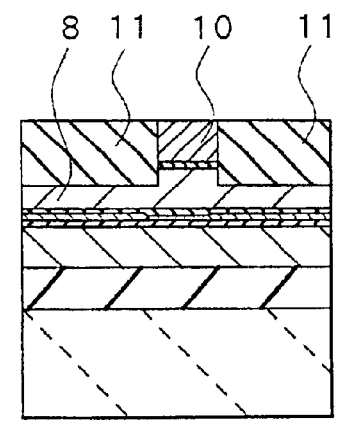
FIG.5A  FIG.5B

METHOD OF MANUFACTURING A THIN-FILM MAGNETIC HEAD

This is a division of application Ser. No. 09/184,284 filed Nov. 2, 1998, now U.S. Pat. No. 6,385,012.

BACKGROUND OF THE INVENTION

1. Field of the Invention

The present invention relates to a thin-film magnetic head having a thin-film magnetic head element and a plurality of electrodes for electrically connecting the element to an external device and a method of manufacturing the thin-film magnetic head, and to a thin-film magnetic head material used for manufacturing the thin-film magnetic head and a method of manufacturing the material.

2. Description of the Related Art

Performance improvements in thin-film magnetic heads have been sought with an increase in surface recording density of a hard disk drive. A composite thin-film magnetic head has been widely used which is made of a layered structure including a recording head (which may be called recording element in the following description) having an induction magnetic transducer for writing and a reproducing head having a magnetoresistive (MR) element for reading. MR elements include an anisotropic magnetoresistive (AMR) element that utilizes the AMR effect and a giant magnetoresistive (GMR) element that utilizes the GMR effect. A reproducing head using an AMR element is called AMR head or simply MR head. A reproducing head using a GMR element is called GMR head. An AMR head is used as a reproducing head whose surface recording density is more than 1 gigabit per square inch. A GMR head is used as a reproducing head whose surface recording density is more than 3 gigabits per square inch.

In general, an AMR film is made of a magnetic substance that exhibits the MR effect and has a single-layer structure. In contrast, many of GMR films have a multilayer structure consisting of a plurality of films. There are several types of mechanisms of producing the GMR effect. The layer structure of a GMR film depends on the mechanism. GMR films include a superlattice GMR film, a spin valve film and a granular film. The spin valve film is most efficient since the film has a relatively simple structure, exhibits a great change in resistance in a low magnetic field, and suitable for mass production.

Besides selection of a material as described above, the pattern width such as the MR height, in particular, is one of the factors that determine the performance of a reproducing head. The MR height is the length (height) between the end of an MR element closer to the air bearing surface (medium facing surface) and the other end. The MR height is basically controlled by an amount of lapping when the air bearing surface is processed.

Performance improvements in a recording head have been expected, too, with performance improvements in a reproducing head. It is required to increase the track density of a magnetic recording medium in order to increase the recording density among the performances of a recording head. In order to achieve this, a recording head of a narrow track structure has been desired to be manufactured by processing the magnetic pole into the submicron order through the use of semiconductor process techniques. The magnetic pole made of a magnetic material having high saturation flux density has been desired in order to achieve the narrow-track recording head.

Another factor determining the recording head performance is the throat height. The throat height is the length (height) of the portion (called pole portion in the present invention) between the air bearing surface and the edge of the insulating layer electrically isolating the thin-film coil. A reduction in throat height is desired in order to improve the recording head performance. The throat height is controlled as well by an amount of lapping when the air bearing surface is processed.

As thus described, it is important to fabricate a recording head and a reproducing head appropriately balanced so as to improve performances of a thin-film magnetic head.

The manufacturing process of a thin-film magnetic head includes a wafer process for forming thin-film patterns on a wafer as a substrate and a lapping process for adjusting the throat height and the MR height by lapping. The wafer process includes a number of mask steps, film forming steps by plating and sputtering, etching steps by sputtering, dry etching, wet etching and so on, and lapping steps by chemical mechanical polishing (CMP) and the like. The performance and characteristics of the thin-film magnetic head may be modified by changing the track width of the reproducing element and the track width of the recording element and so on. Therefore, thin-film magnetic heads that meet a variety of needs of customers may be manufactured by determining the track width of the reproducing element and that of the recording element and so on, using masks that satisfy required specifications.

The manufacturing process of a thin-film magnetic head includes a number of steps and it takes an extremely long period of time to manufacture one product. Therefore, in order to manufacture the magnetic head having the performance and characteristics that meet the needs of the customer, it is required to carefully work out a detailed production plan so that the performance and characteristics of the magnetic head may be changed by photomask selection.

However, the needs of the customers are not limited to those relating to the performance and characteristics of the thin-film magnetic head that are determined in the wafer process but embrace the needs relating to a slider for retaining the magnetic head element and flying over the surface of a hard disk platter. The needs of the customers for a slider may be, for example, whether to choose a side element type slider or a center element type slider. The side element type slider is a slider wherein a thin-film magnetic head element is formed near an end of the slider in the direction orthogonal to the direction of air flow. The center element type slider is a slider wherein a thin-film magnetic head element is formed in the center of the slider in the direction orthogonal to the direction of air flow. The side element type slider and the center element type slider are typical sliders. In these days sliders are tend to be largely categorized into the above two types for satisfying the demand for the flying characteristics over the surface of the hard disk platter.

Reference is now made to FIG. 35 to FIG. 38 for describing the side element type slider and the center element type slider.

FIG. 35 is a schematic front view of a surface of the side element type slider in which a thin-film magnetic head element is formed. FIG. 36 is a schematic bottom view of the air bearing surface of the side element type slider. In FIG. 36 the arrow indicated with numeral 120 shows the direction of air flow. 'LE' indicates the air inflow end. 'TR' indicates the air outflow end. In the side element type slider, as shown in FIG. 35 and FIG. 36, a thin-film magnetic head element 111 is formed near an end of the slider in the direction orthogonal to the direction of air flow, in the vicinity of an end face (end face of air outflow end TR in this example) 110 orthogonal to the direction of air flow. On the end face 110, four pad-shaped electrodes 112 are provided for electrically connecting the magnetic head element 111 to an external device. The four electrodes 112 are connected to the magnetic head element 111 through four conductors 113. A rail 115 is formed in the air bearing surface of the slider.

FIG. 37 is a schematic front view of a surface of the center element type slider in which a thin-film magnetic head element is formed. FIG. 38 is a schematic bottom view of the air bearing surface of the center element type slider. Numeral 120, 'LE' and 'TR' of FIG. 38 are similar to those of FIG. 36. In the center element type slider, as shown in FIG. 37 and FIG. 38, the thin-film magnetic head element 111 is formed in the middle of the slider in the direction orthogonal to the direction of air flow, in the vicinity of an end face (end face of air outflow end TR in this example) 110 orthogonal to the direction of air flow. On the end face 110, four pad-shaped electrodes 112 are provided for electrically connecting the magnetic head element 111 to an external device. The four electrodes 112 are connected to the magnetic head element 111 through the four conductors 113. The rail 115 is formed in the air bearing surface of the slider.

However, it is impossible to change between the side element type slider and the center element type slider by simply changing a photomask in an intermediate step in the manufacturing process of the thin-film magnetic head. It is therefore required in related-art techniques to prepare different sets of masks for the respective types of sliders and separately manufacture the sliders in volume.

In a hard disk drive for high density recording, a plurality of hard disk platters such as four or six platters are placed on top of one another. FIG. 39 illustrates an arrangement of thin-film magnetic heads in such a hard disk drive using a plurality of platters. A plurality of hard disk platters 122 are held by a rotating axis 121 in such a hard disk drive. The hard disk drive includes a thin-film magnetic head (called up-type magnetic head in the following description) 123, placed beneath the platter 122, whose medium facing surface faces upward; and a thin-film magnetic head (called down-type magnetic head in the following description) 124, placed above the platter 122, whose medium facing surface faces downward. The up-type magnetic head 123 and the down-type magnetic head 124 are coupled to a moving arm 125 through a suspension 126. The structural difference between the up-type magnetic head 123 and the down-type magnetic head 124 is the difference in position of the reproducing element and the recording element.

Accordingly, two kinds of the side element type slider and the center element type slider are each required for the up-type magnetic head and the down-type magnetic head. The total of four kinds of thin-film magnetic heads are thus required. In related-art techniques different sets of masks for twenty to thirty mask processing steps are prepared for each kind of magnetic head and magnetic heads of each kind are produced in volume. In a planned production, different mass-production lots are prepared for the respective kinds of magnetic heads for manufacturing magnetic heads that meet the customer's needs.

In the related-art techniques thus described, thin-film magnetic heads are produced, using different masks or different mass-production lots for the respective kinds of magnetic heads. As a result, a cycle time, that is, a period of time between an order and a shipment is long and manufacturing costs are raised.

In particular, modifications and improvements in specifications of hard disk drives are made in a short period of time in these days. The customers of thin-film magnetic heads therefore demand that the magnetic heads that meet desired specifications are supplied shortly after the order. Consequently, the manufacturer of thin-film magnetic heads is required to manufacture a variety of products in small quantities that meet specifications demanded by the customers in a short period of time. The above-mentioned problems are therefore noticeable.

Where the related-art techniques are used, there are many cases in which specifications required by the customer are modified in the course of mass-production of thin-film magnetic heads meeting the specifications and mass-production is required to be restarted from the first step. Consequently, waste results and manufacturing costs are raised.

Where the related-art techniques are used, the manufacturer of thin-film magnetic heads estimates the number of products to be ordered by the customer and specifications required and mass-produces magnetic heads prior to the order, in some cases, in order to strictly maintain the product shipping schedule of the customer or to beat the competitors by immediate delivery. However, the number of products ordered by the customer and specifications required may go far beyond the estimates of the manufacturer since the customer may quickly respond to the users' needs. In such a case the manufacturer has to keep a number of undelivered stocks and to produce new mass-production lots that meet the demand of the customer extremely quickly, regardless of the average cycle time. Since the specifications required by the customer or those of a final product change every six months, for example, in these days, undelivered products in stock for a couple of months are equivalent to nonconforming stocks to be wasted. Mass-production disregarding the average cycle time affects the balance of the mass-production line and reduces the mass-production capacities.

Techniques of forming two head elements in one slider and selecting one of the head elements for use are disclosed in Japanese Patent Application Laid-open Sho 61-296518 (1986), Japanese Patent Application Laid-open Hei 3-95715 (1991) and Japanese Patent Application Laid-open Hei 6-203330 (1994). The techniques allow most of photomasks to be common and to manufacture the up-type thin-film magnetic heads and the down-type thin-film magnetic heads.

In the techniques disclosed in the above-mentioned publications, however, the two heads elements are placed so that the magnetic poles of the two head elements face the same surface of the slider. Therefore, in order to form the up-type head element for the center element type and the down-type head element for the center element type in one slider through the techniques, there is no way but to place the two head elements side by side in a position near the middle of the slider in the direction orthogonal to the direction of air flow, in the vicinity of an end face orthogonal to the direction of air flow. Therefore, it is impossible to form the two head elements for the center element type both in the middle of the slider in the direction orthogonal to the direction of air flow, according to the techniques disclosed in the above-mentioned publications. Consequently, it is impossible in some cases to supply thin-film magnetic heads that meet the specifications required by the customer.

In Japanese Patent Application Laid-open Hei 8-87848 (1996), a technique is disclosed for forming rails on both sides of a slider and forming two head elements so that the tips of the head elements are placed on both of the rails. The technique allows the single slider to read and write data on neighboring two magnetic disk platters.

However, the technique requires pad-shaped electrodes for the two head elements. Eight electrodes are therefore required if the technique is applied to a composite thin-film magnetic head. It is difficult to place the eight electrodes in one slider. It is therefore difficult to implement the technique.

OBJECT AND SUMMARY OF THE INVENTION

The invention is designed to overcome the foregoing problems. It is an object of the invention to provide a thin-film magnetic head and a method of manufacturing the same and a thin-film magnetic head material and a method of manufacturing the same for providing a thin-film magnetic head that meets specifications required by the customer in a short period of time and reducing manufacturing costs.

A thin-film magnetic head of the invention comprises: a main body having a first surface and a second surface facing directions opposed to each other wherein a thin-film magnetic head element is to be formed; a plurality of thin-film magnetic head element portions formed in the main body, each having a main part of the thin-film magnetic head and including at least one first thin-film magnetic head element portion whose tip faces the first surface and at least one second thin-film magnetic head element portion whose tip faces the second surface; a plurality of electrodes, formed in the main body, for electrically connecting any of the element portions to an external device; and a plurality of conductors, formed in the main body, for electrically connecting selected one of the element portions to the electrodes.

According to the thin-film magnetic head, selected one of the element portions is electrically connected to the electrodes through the conductors. As a result, thin-film magnetic heads of several types of specifications may be selectively provided.

In the thin-film magnetic head of the invention the first thin-film magnetic element portion and the second thin-film magnetic element portion may be placed in symmetrical positions with respect to a place parallel to the first and second surfaces. The place parallel to the first and second surfaces is an imaginary plane placed in a midpoint between the first and second surfaces.

In the thin-film magnetic head of the invention the thin-film magnetic element portions may each comprise: an induction-type magnetic transducer having first and second magnetic layers magnetically connected to each other and each made up of at least one layer and including pole portions parts of which facing a recording medium are opposed to each other with a recording gap layer in between, and thin-film coil placed between the first and second magnetic layers. The conductors may be connected to the thin-film coil.

In the thin-film magnetic head of the invention the thin-film magnetic head element portions may each comprise a magnetoresistive element and the conductors may be connected to the magnetoresistive element.

The thin-film magnetic head of the invention may further comprise intermediate connecting portions, provided for the respective thin-film magnetic head element portions and connected to the element portions, to which the conductors are selectively connected.

A method of manufacturing a thin-film magnetic head of the invention includes the steps of: forming a plurality of thin-film magnetic head element portions in a section to be a main body wherein a thin-film magnetic head element is to be formed in a substrate, the section having a first surface and a second surface facing directions opposed to each other, the element portions each having a main part of a thin-film magnetic head and including at least one first thin-film magnetic head element portion whose tip faces the first surface and at least one second thin-film magnetic head element portion whose tip faces the second surface; forming a plurality of electrodes, in the section to be the main body, for electrically connecting any of the element portions to an external device; and forming a plurality of conductors, in the section to be the main body, for electrically connecting selected one of the element portions to the electrodes.

According to the method of manufacturing a thin-film magnetic head, selected one of the element portions is electrically connected to the electrodes through the conductors. As a result, thin-film magnetic heads of several types of specifications may be selectively provided.

In the method of the invention the first thin-film magnetic element portion and the second thin-film magnetic element portion may be placed in symmetrical positions with respect to a place parallel to the first and second surfaces in the step of forming the element portions.

In the method of the invention the step of forming the electrodes may be performed either before or after the step of forming the conductors.

In the method of the invention the thin-film magnetic element portions may each comprise an induction-type magnetic transducer having first and second magnetic layers magnetically connected to each other and each made up of at least one layer and including pole portions parts of which facing a recording medium are opposed to each other with a recording gap layer in between, and thin-film coil placed between the first and second magnetic layers. The conductors may be connected to the thin-film coil. The step of forming the element portions may include the steps of forming the first magnetic layer, forming the thin-film coil on the first magnetic layer, and forming the second magnetic layer on the thin-film coil.

In the method of the invention the thin-film magnetic head element portions may each comprise a magnetoresistive element. The conductors may be connected to the magnetoresistive element.

The method of the invention may further include, before the step of forming the conductors, the step of forming intermediate connecting portions for the respective thin-film magnetic head element portions, connected to the element portions, to which the conductors are selectively connected. The conductors may be connected to the intermediate connecting portion corresponding to selected one of the element portions.

In the method of the invention the step of forming the conductors may be performed simultaneously with the step of forming the thin-film coil or with the step of forming the second magnetic layer, or may be performed after the step of forming the second magnetic layer.

A thin-film magnetic head material of the invention comprises a plurality of thin-film magnetic head element portions formed in a section to be a main body wherein a thin-film magnetic head element is to be formed in a substrate, the section having a first surface and a second surface facing directions opposed to each other, the element portions each having a main part of a thin-film magnetic head and including at least one first thin-film magnetic head element portion whose tip faces the first surface and at least one second thin-film magnetic head element portion whose tip faces the second surface, the element portions being selectively connected through a plurality of conductors to a plurality of electrodes providing electrical connection to an external device.

According to the thin-film magnetic head material, selected one of the element portions is electrically connected to the electrodes through the conductors, using the material. As a result, thin-film magnetic heads of several types of specifications may be selectively manufactured.

In the thin-film magnetic head material of the invention the first thin-film magnetic element portion and the second thin-film magnetic element portion may be placed in symmetrical positions with respect to a place parallel to the first and second surfaces.

The thin-film magnetic head material may further comprise the electrodes.

In the thin-film magnetic head material the thin-film magnetic element portions may each comprise at least part of an induction-type magnetic transducer having first and second magnetic layers magnetically connected to each other and each made up of at least one layer and including pole portions parts of which facing a recording medium are opposed to each other with a recording gap layer in between, and thin-film coil placed between the first and second magnetic layers.

In the thin-film magnetic head material the thin-film magnetic head element portions may each comprise a magnetoresistive element.

The thin-film magnetic head material may further comprise intermediate connecting portions, provided for the respective thin-film magnetic head element portions and connected to the element portions, to which the conductors are selectively connected.

A method of manufacturing a thin-film magnetic head material of the invention includes the step of forming a plurality of thin-film magnetic head element portions in a section to be a main body wherein a thin-film magnetic head element is to be formed in a substrate, the section having a first surface and a second surface facing directions opposed to each other, the element portions each having a main part of a thin-film magnetic head and including at least one first thin-film magnetic head element portion whose tip faces the first surface and at least one second thin-film magnetic head element portion whose tip faces the second surface and the element portions being selectively connected through a plurality of conductors to a plurality of electrodes providing electrical connection to an external device.

According to the method of manufacturing a thin-film magnetic head material, a material comprising a plurality of element portions may be manufactured. Selected one of the element portions is electrically connected to the electrodes through the conductors, using the material. As a result, thin-film magnetic heads of several types of specifications may be selectively manufactured.

In the method the first thin-film magnetic element portion and the second thin-film magnetic element portion may be placed in symmetrical positions with respect to a place parallel to the first and second surfaces in the step of forming the element portions.

The method may further include the step of forming the electrodes.

In the method the thin-film magnetic element portions may each comprise at least part of an induction-type magnetic transducer having first and second magnetic layers magnetically connected to each other and each made up of at least one layer and including pole portions parts of which facing a recording medium are opposed to each other with a recording gap layer in between, and thin-film coil placed between the first and second magnetic layers.

In the method the thin-film magnetic head element portions may each comprise a magnetoresistive element.

The method may further include the step of forming intermediate connecting portions for the respective thin-film magnetic head element portions, the connecting portions being connected to the element portions, the conductors being selectively connected to the connecting portions.

Other and further objects, features and advantages of the invention will appear more fully from the following description.

BRIEF DESCRIPTION OF THE DRAWINGS

FIG. 1A and FIG. 1B are cross sections for illustrating a step in a method of manufacturing the main part of a composite thin-film magnetic head common to embodiments of the invention.

FIG. 2A and FIG. 2B are cross sections for illustrating a step that follows FIG. 1A and FIG. 1B.

FIG. 3A and FIG. 3B are cross sections for illustrating a step that follows FIG. 2A and FIG. 2B.

FIG. 4A and FIG. 4B are cross sections for illustrating a step that follows FIG. 3A and FIG. 3B.

FIG. 5A and FIG. 5B are cross sections for illustrating a step that follows FIG. 4A and FIG. 4B.

DETAILED DESCRIPTION OF THE PREFERRED EMBODIMENTS

Figures 6A, 6B:
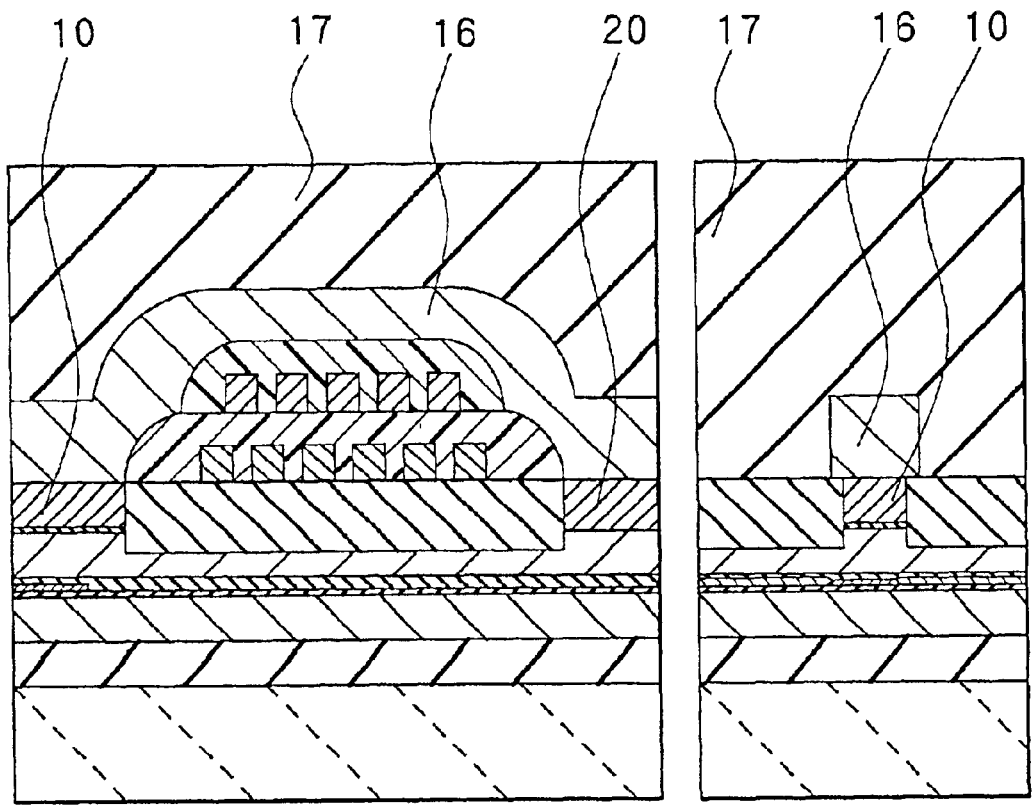
FIG. 6A and FIG. 6B are cross sections for illustrating a step that follows FIG. 5A and FIG. 5B.

Preferred embodiments of the invention will now be described in detail with reference to the accompanying drawings. The following embodiments are examples wherein the invention is applied to composite thin-film magnetic heads.

Reference is now made to FIG. 1A and FIG. 1B to FIG. 6A and FIG. 6B for describing a method of manufacturing the main part of a composite thin-film magnetic head that is common to the embodiments. FIG. 1A to FIG. 6A are cross sections each orthogonal to an air bearing surface. FIG. 1B to FIG. 6B are cross sections of a pole portion each parallel to the air bearing surface. The configuration and the manufacturing method that will be described with reference to the drawings are those of an example of the thin-film magnetic head of the invention.

In the method of manufacturing the thin-film magnetic head, as shown in FIG. 1A and FIG. 1B, an insulating layer 2 made of alumina ($Al_2O_3$), for example, of about 5 to 10 $\mu$m in thickness is deposited on a substrate 1 made of aluminum oxide and titanium carbide ($Al_2O_8$—TiC), for example. Next, a bottom shield layer 3 made of a magnetic material for a reproducing head is formed on the insulating layer 2.

Next, as shown in FIG. 2A and FIG. 2B, on the bottom shield layer 3 alumina of 100 to 200 nm in thickness, for example, is deposited through sputtering to form a bottom shield gap film 4 as an insulating layer. On the bottom shield gap film 4 an MR film of tens of nanometers in thickness for making up an MR element 5 for reproducing is formed. The MR film is then etched by ion milling, for example, with a photoresist pattern as a mask to form the MR element 5. The MR element 5 may be either a GMR element or an AMR element. Next, an electrode layer 6 to be electrically connected to the MR element 5 is formed on the bottom shield gap film 4 through the lift-off method, for example. Next, a top shield gap film 7 as an insulating layer is formed on the bottom shield gap film 4, the MR element 5, and the electrode layer 6. The MR element 5 is then buried in the shield gap films 4 and 7. Next, on the top shield gap film 7 a top shield layer-cum-bottom pole (called top shield layer in the following description) 8 made of a magnetic material, of about 3 $\mu$m in thickness is formed. The top shield layer 8 is used for both reproducing head and recording head.

Next, as shown in FIG. 3A and FIG. 3B, a recording gap layer 9 made of an insulating film of alumina, for example, having a thickness of about 200 nm is formed on the top shield layer 8. A contact hole is then formed in the backward portion (the right-side region of FIG. 3A) by partially etching the recording gap layer 9 for forming a magnetic path. Next, on the recording gap layer 9 in the pole portion, a pole tip 10 of 0.5 to 1 $\mu$m in thickness is formed. The pole tip 10 is made of a magnetic material for a recording head such as FeN or Permalloy (NiFe) that exhibits a high saturation flux density and forms part of the top pole. At the same time, a magnetic layer 20 made of a magnetic material for forming the magnetic path is formed on the contact hole for forming the magnetic path.

Next, as shown in FIG. 4A and FIG. 4B, the recording gap layer 9 and the top shield layer (bottom pole) 8 are etched by ion milling with the pole tip 10 as a mask. As shown in FIG. 4B, the sidewalls of the top pole (the pole tip 10), the recording gap layer 9 and part of the top shield layer (bottom pole) 8 are vertically formed in a self-aligned manner. Such a structure is called trim structure. The trim structure suppresses an increase in the effective track width due to expansion of the magnetic flux generated during writing in the narrow track.

Next, an insulating layer 11 of alumina, for example, of about 3 $\mu$m in thickness is formed over the entire surface. The insulating layer 11 is then ground to the surfaces of the pole tip 10 and the magnetic layer 20 and flattened through mechanical polishing or chemical mechanical polishing (CMP). The surfaces of the pole tip 10 and the magnetic layer 20 are exposed through the flattening.

Next, as shown in FIG. 5A and FIG. 5B, on the flattened insulating layer 11, a thin-film coil 12 of a first layer made of copper (Cu), for example, for an induction recording head is formed through plating, for example. Next, a photoresist layer 13 of a specific pattern is formed on the insulating layer 11 and the coil 12. Heat treatment at a temperature of 250 to 300° C., for example, is performed to flatten the surface of the photoresist layer 13. Next, on the photoresist layer 13, a thin-film coil 14 of a second layer, made of copper, for example, is formed through plating, for example. Next, a photoresist layer 15 of a specific pattern is formed on the photoresist layer 13 and the coil 14. Heat treatment at a temperature of 250 to 300° C., for example, is performed to flatten the surface of the photoresist layer 15.

Next, as shown in FIG. 6A and FIG. 6B, a top pole layer 16 made of a magnetic material for a recording head such as Permalloy is formed on the pole tip 10, the photoresist layers 13 and 15, and the magnetic layer 20. An overcoat layer 17 of alumina, for example, is formed over the top pole layer 16. Finally, mechanical processing of the slider is performed and the air bearing surface of the recording head and the reproducing head is formed. The composite thin-film magnetic head is thus completed.

Figure 7:
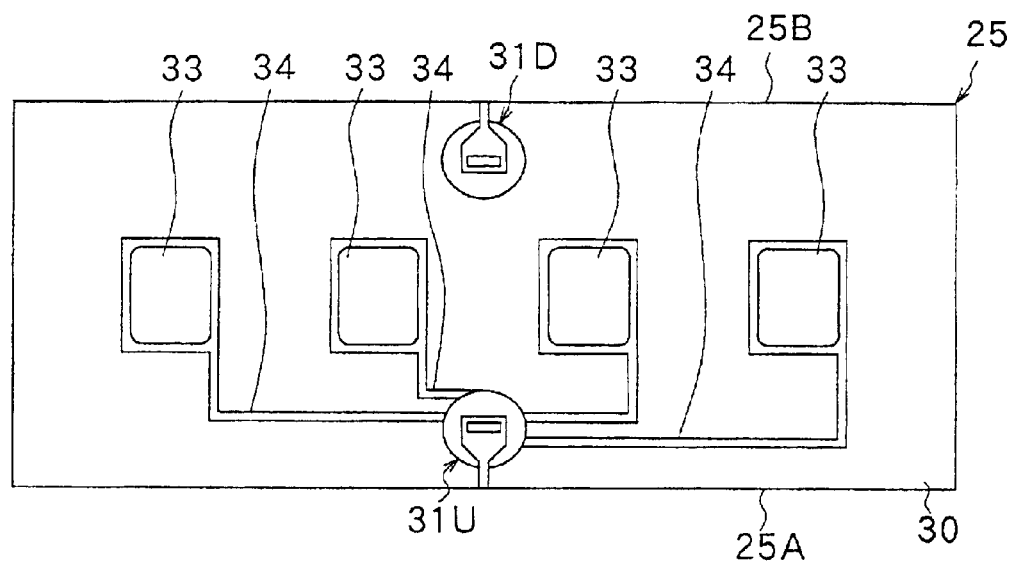
FIG. 7 is a schematic front view of the surface of the up type of the center element type slider of a first embodiment of the invention in which thin-film magnetic head element portions are formed.
Figure 8:
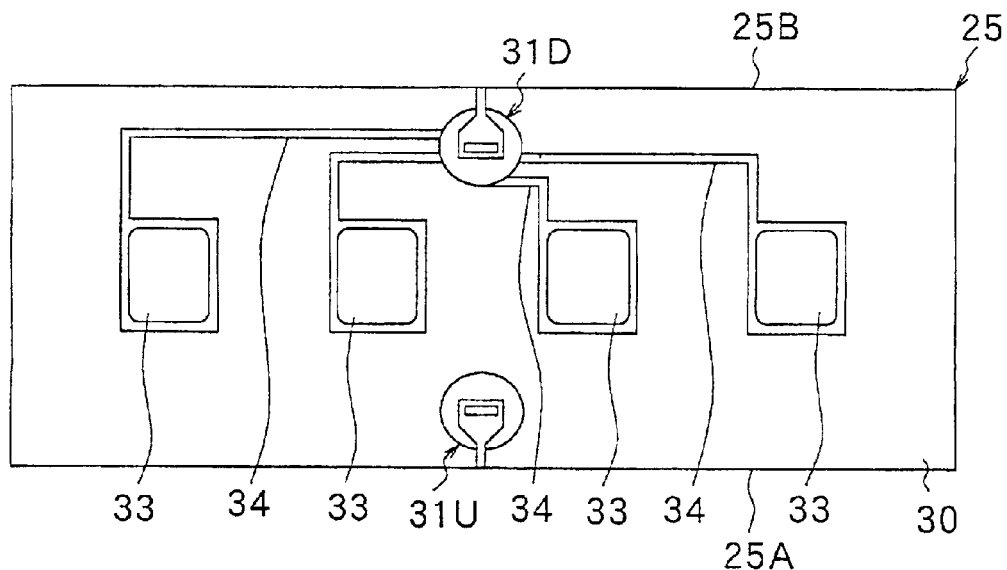
FIG. 8 is a schematic front view of the surface of the down type of the center element type slider of the first embodiment in which thin-film magnetic head element portions are formed.
Figure 9:
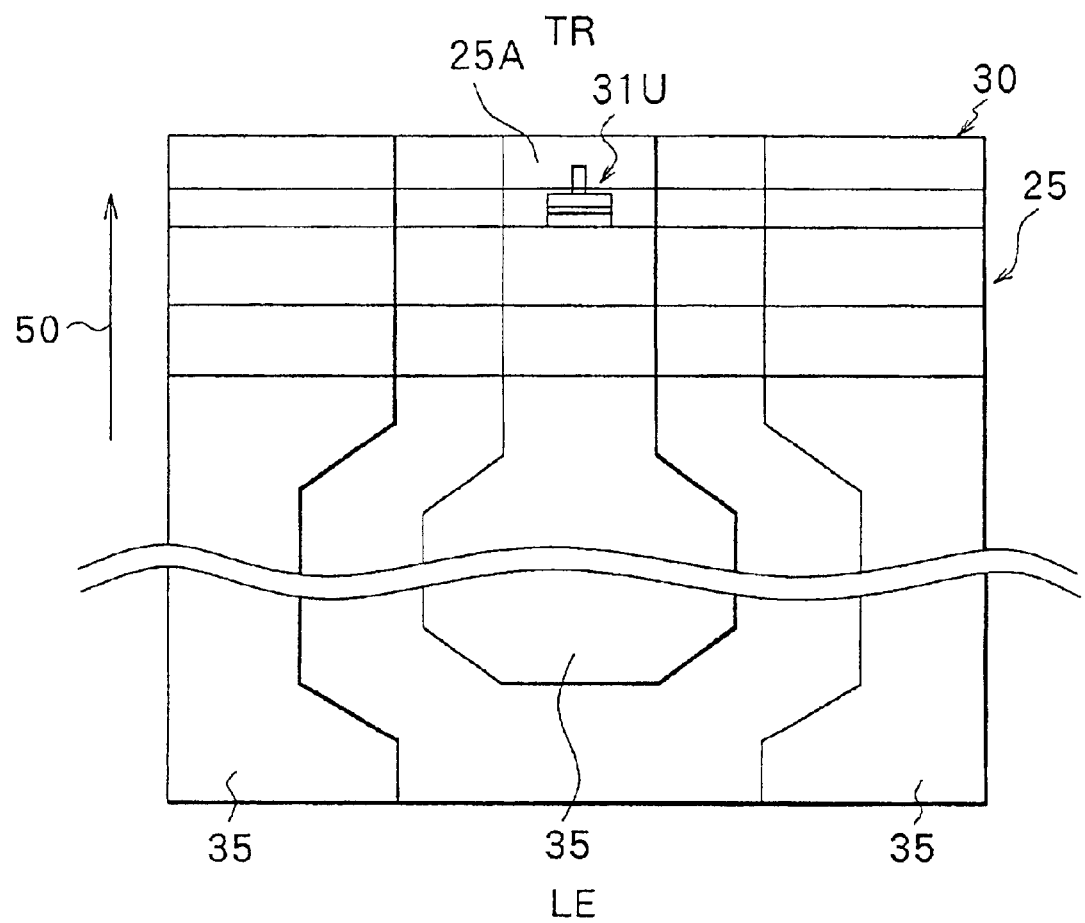
FIG. 9 is a schematic bottom view of the air bearing surface of the slider of the first embodiment.

Reference is now made to FIG. 7 to FIG. 9 for describing a thin-film magnetic head and a method of manufacturing the same, and a thin-film magnetic head material and a method of manufacturing the same of a first embodiment of the invention. According to the embodiment, two thin-film magnetic head element portions are formed in one slider, that is, a portion to be a main body of a thin-film magnetic head on a substrate. The two thin-film magnetic head element portions include a portion having the main part of an up-type thin-film magnetic head element for the center element type, and a portion having the main part of a down-type thin-film magnetic head element for the center element type. Selection between the up type of the center element type and the down type of the center element type is allowed by changing the pattern of conductors between the thin-film magnetic head element portions and electrodes.

FIG. 7 and FIG. 8 are schematic front views of the surface of the slider of the embodiment in which the thin-film magnetic head element portions are formed. FIG. 7 illustrates the up type of the center element type. FIG. 8 illustrates the down type of the center element type. FIG. 9 is a schematic bottom view of the air bearing surface of the slider of the embodiment. In FIG. 9 the arrow indicated with numeral 50 shows the direction of air flow. 'LE' indicates the air inflow end. 'TR' indicates the air outflow end.

As shown in FIG. 7 to FIG. 9, the thin-film magnetic head of the embodiment comprises a slider 25 that flies over the surface of a recording medium (hard disk platter). The slider 25 corresponds to a main body of the invention. The slider 25 includes a first surface 25A and a second surface 25B facing the directions opposite to each other. Either the first surface 25A or the second surface 25B is to be the air bearing surface (medium facing surface).

In the slider 25 two thin-film magnetic head element portions 31U and 31D are formed near an end face 30 orthogonal to the direction of air flow. The one thin-film magnetic head element portion 31U is provided for the up type of the center element type. The head element portion 31U is formed in the middle of the slider in the direction orthogonal to the direction of air flow so that the tip thereof faces the first surface 25A. The other thin-film magnetic head element portion 31D is provided for the down type of the center element type. The head element portion 31D is formed in the middle of the slider in the direction orthogonal to the direction of air flow so that the tip thereof faces the second surface 25B. The two head element portions 31U and 31D are each placed in symmetrical positions with respect to a plane parallel to the first surface 25A and the second surface 25B.

On the end face 30 four pad-shaped electrodes 33 are provided for electrically connecting the head element portions 31U and 31D to an external device. The electrodes 33 are electrically connected to either the head element portion 31U or 31D through four conductors 34. As shown in FIG. 7, if the head element portion 31U is connected to the electrodes 33 through the conductors 34, the up-type thin film magnetic head for the center element type is obtained. As shown in FIG. 8, if the head element portion 31D is connected to the electrodes 33 through the conductors 34, the down-type thin film magnetic head for the center element type is obtained.

As shown in FIG. 9, a rail 35 is formed in the air bearing surface of the slider 25. FIG. 9 illustrates the up-type thin film magnetic head for the center element type wherein the head element portion 31U is used. In this case the first surface 25A functions as the air bearing surface. The second surface 25B functions as the air bearing surface for the down-type thin film magnetic head for the center element type wherein the head element portion 31D is used.

An example of the basic configuration of the head element portions 31U and 31D is shown in FIG. 6A and FIG. 6B. The head element portions 31U and 31D each include the MR element 5 for reading and the induction magnetic transducer for writing. The induction magnetic transducer includes the first and second magnetic layers and the thin-film coils 12 and 14 placed between the first and second magnetic layers. The first and second magnetic layers are each made up of at least one layer, and magnetically connected to each other. The first and second magnetic layers each include pole portions. The parts of the pole portions facing the recording medium are opposed to each other with the recording gap layer 9 in between. In the embodiment the top shield layer (bottom pole) 8 corresponds to the first magnetic layer. The pole tip 10, the top pole layer 16 and the magnetic layer 20 correspond to the second magnetic layer.

Two of the four conductors 34 shown in FIG. 7 or FIG. 8 are connected to the thin-film coils 12 and 14. The remaining two are connected to the MR element 5 through the electrode layer 6.

In the embodiment the steps of forming the conductors 34 may be performed simultaneously with the steps of forming the thin-film coils 12 and 14 or with the step of forming the top pole layer 16 as the second magnetic layer.

Figure 10:
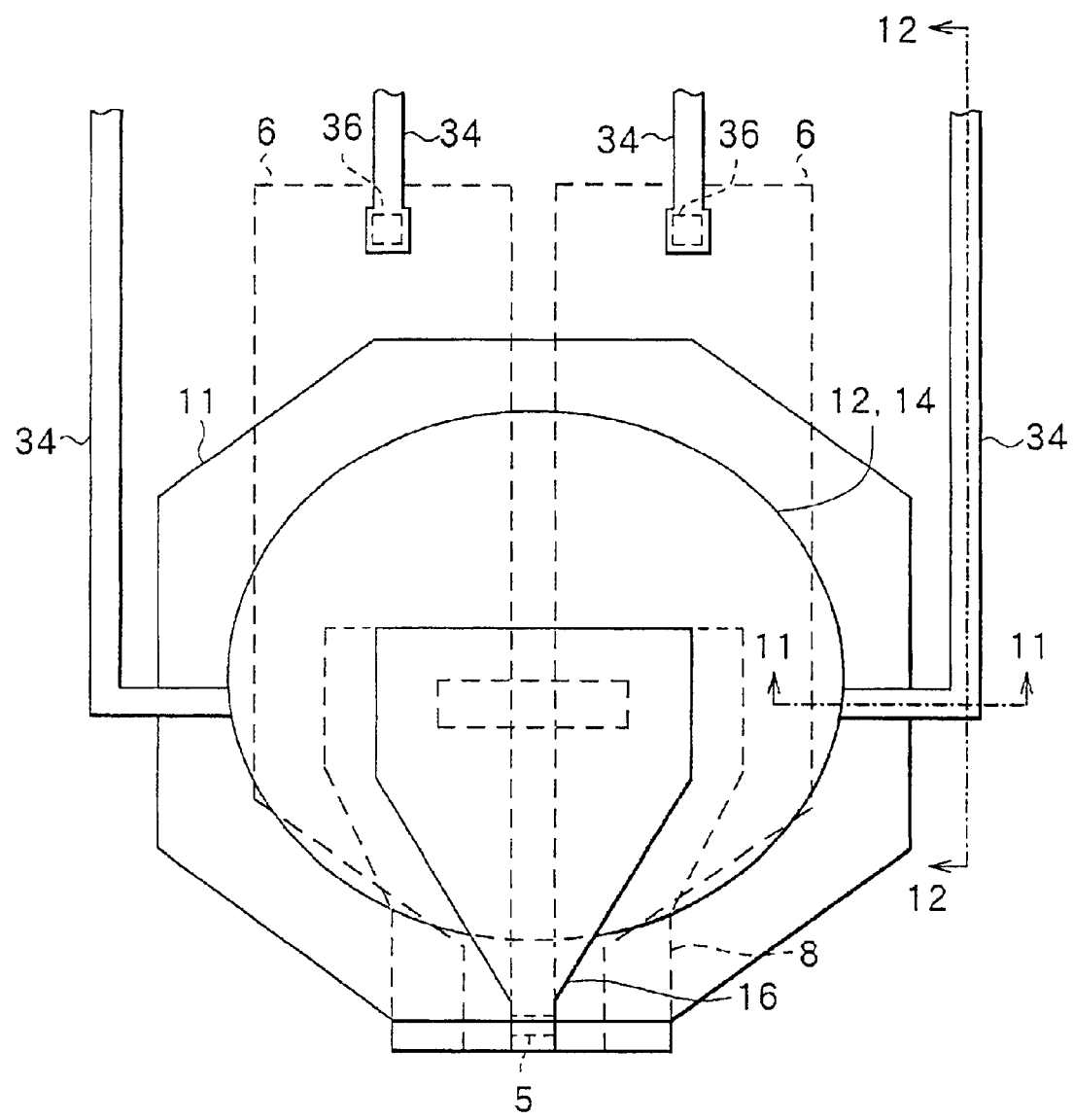
FIG. 10 is a top view of the head element portions wherein the step of forming the conductors are performed simultaneously with the steps of forming thin-film coils in the first embodiment.
Figure 11:
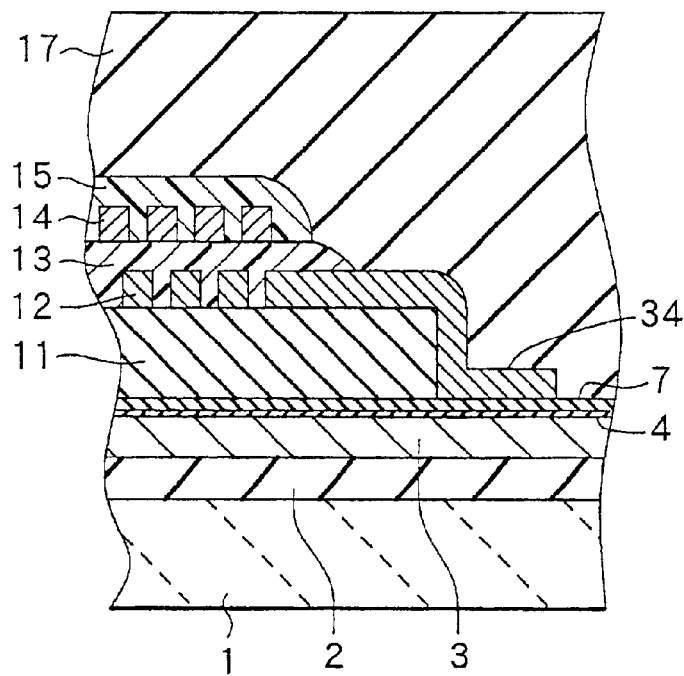
FIG. 11 is a cross section taken along line 11—11 of FIG. 10.
Figure 12:
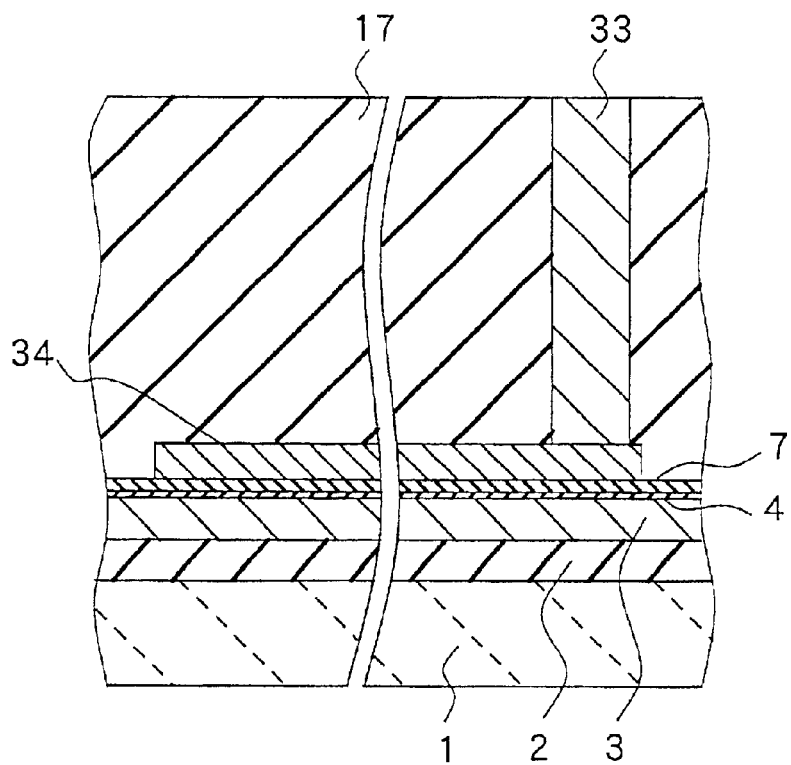
FIG. 12 is a cross section taken along line 12—12 of FIG. 10.

Reference is now made to FIG. 10 to FIG. 12 for describing a method of forming the conductors 34 and the electrodes 33 wherein the step of forming the conductors 34 are performed simultaneously with the steps of forming the thin-film coils 12 and 14. FIG. 10 is a top view of the head element portions 31U and 31D. FIG. 11 is a cross section taken along line 11—11 of FIG. 10. FIG. 12 is a cross section taken along line 12—12 of FIG. 10.

According to the method, the head element portions 31U and 31D are manufactured through one kind of steps until the step prior to the steps of forming the thin-film coils 12 and 14. Contact holes or via holes 36 are each formed for providing connection to the electrode layer 6 near the element portions 31U and 31D, respectively, in the top shield gap film 7 (not shown in FIG. 10). In the steps of forming the thin-film coils 12 and 14, the four conductors 34 of the material same as the thin-film coils 12 and 14 are formed by plating, for example, on the top shield gap film 7. Two of the four conductors 34 are connected to the thin-film coils 12 and 14 of the element portion to be used. The remaining two of the four conductors 34 are each connected to the electrode layer 6 of the element portion to be used through the contact hole 36 formed in the top shield gap film 7, and further connected to the MR element 5 of the element portion to be used through the electrode layer 6. The pole tip 10, the top pole layer 16 and the magnetic layer 20 as the second magnetic layer are then formed.

In the steps of forming the thin-film coils 12 and 14 and the steps of forming the second magnetic layer, the thin-film coils 12 and 14 and the second magnetic layer of the head element portion 31U or 31D which is to be used may be only formed.

Next, before forming the overcoat layer 17, the columnar electrodes (bumps) 33 made of copper, for example, are formed by plating, for example. The electrodes 33 are formed such that the lower ends thereof are connected to the conductors 34. The overcoat layer 17 is then formed to cover the electrodes 33. The top surface of the overcoat layer 17 is then ground to expose the top surfaces of the electrodes 33. Gold (Au) may be sputtered on the exposed top surfaces of the electrodes 33 for preventing oxidation (rusting), if necessary.

According to the method, the two types of thin-film magnetic heads are easily manufactured by preparing the only two types of photomasks corresponding to the patterns of the conductors 34 at least in the steps of forming the thin-film coils 12 and 14 among the steps of forming the coils 12 and 14 and the step of forming the second magnetic layer.

Figure 13:
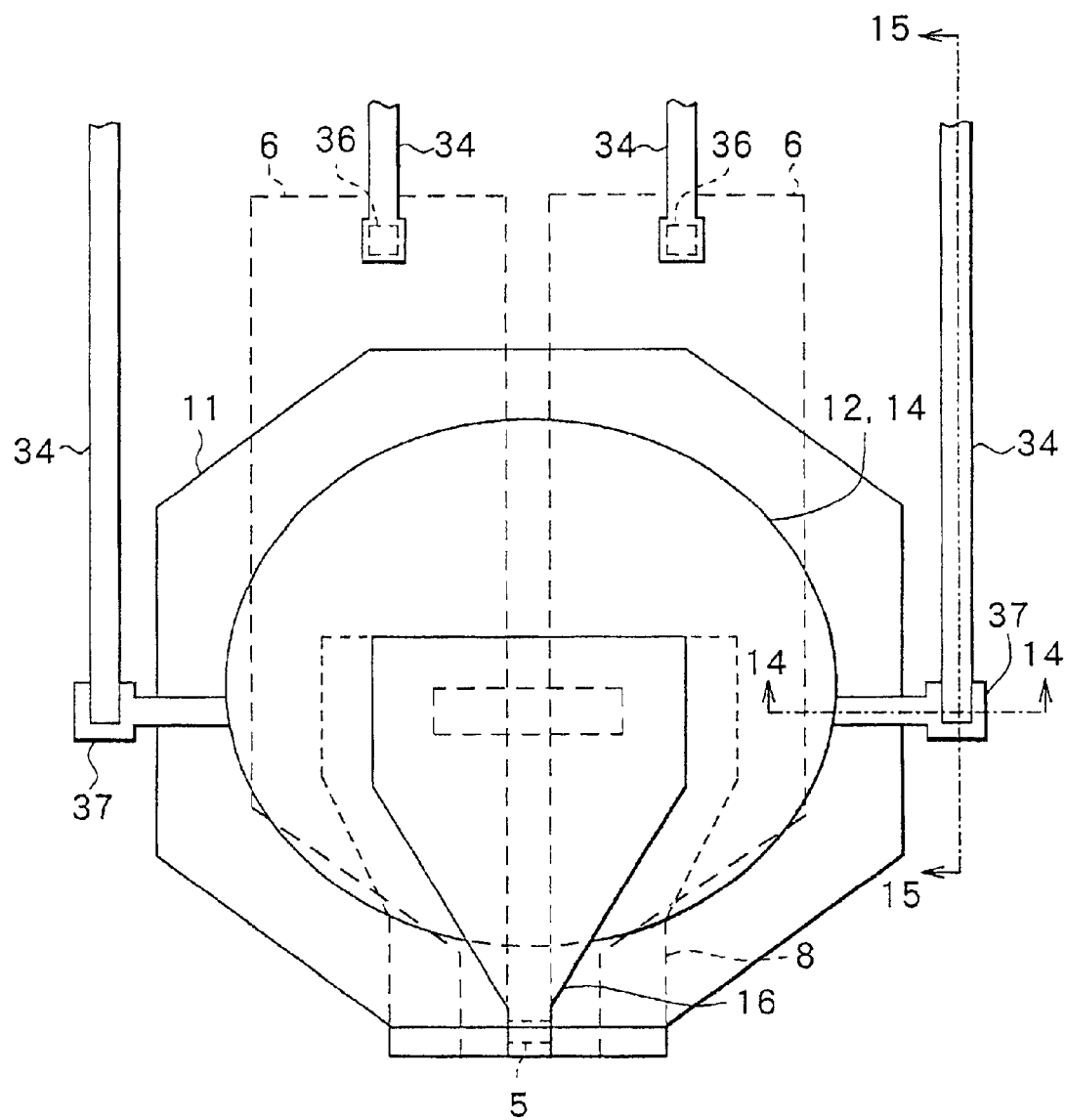
FIG. 13 is a top view of the head element portions wherein the step of forming the conductors are performed simultaneously with the step of forming the top pole layer in the first embodiment.
Figure 14:
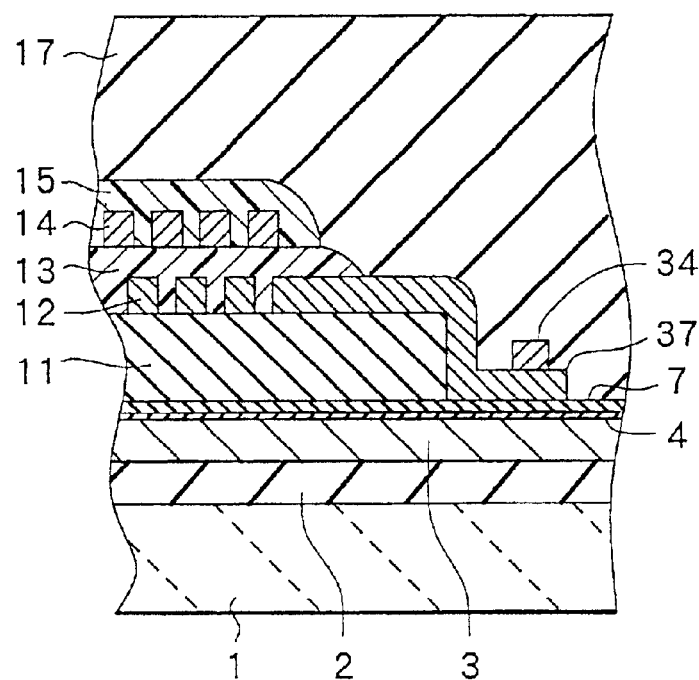
FIG. 14 is a cross section taken along line 14—14 of FIG. 13.
Figure 15:
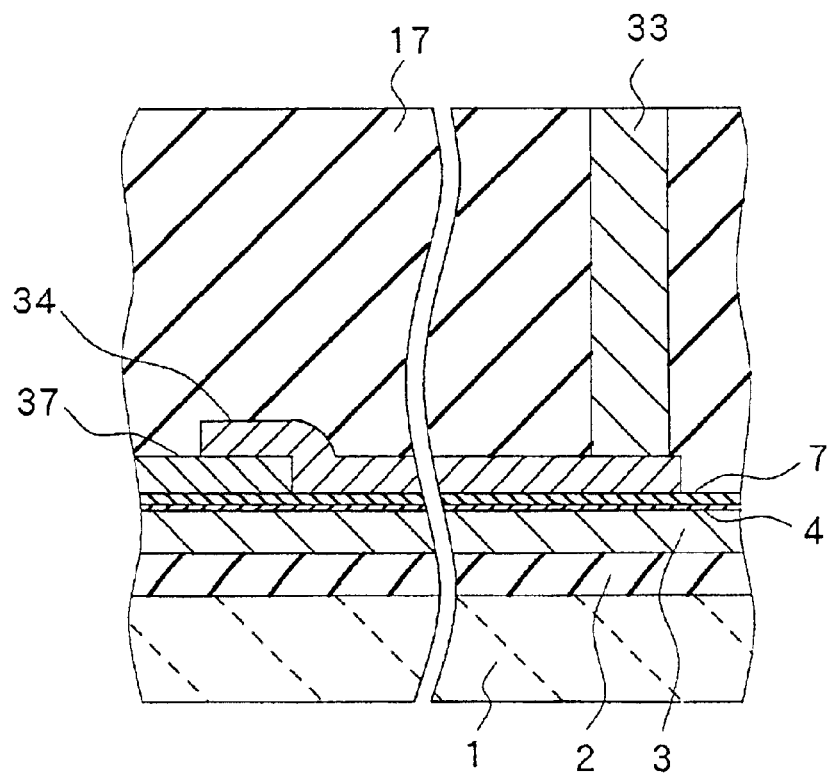
FIG. 15 is a cross section taken along line 15—15 of FIG. 13.

Reference is now made to FIG. 13 to FIG. 15 for describing a method of forming the conductors 34 and the electrodes 33 wherein the step of forming the conductors 34 are performed simultaneously with the step of forming the top pole layer 16. FIG. 13 is a top view of the head element portions 31U and 31D. FIG. 14 is a cross section taken along line 14—14 of FIG. 13. FIG. 15 is a cross section taken along line 15—15 of FIG. 13.

According to the method, the head element portions 31U and 31D are manufactured through one kind of steps until the steps of forming the pole tip 10 and the magnetic layer 20. The contact holes 36 are each formed for providing connection to the electrode layer 6 near the element portions 31U and 31D, respectively, in the top shield gap film 7 (not shown in FIG. 13). In the steps of forming the thin-film coils 12 and 14, intermediate terminals 37 are formed near the element portions 31U and 31D. The intermediate terminals 37 are connected to the thin-film coils 12 and 14 of each of the element portions 31U and 31D. The conductors 34 are selectively connected to the intermediate terminals 37. The intermediate terminals 37 and the contact holes 36 described above correspond to intermediate connecting portions of the invention. In place of the intermediate terminals 37, contact holes may be formed in the photoresist layers 13 and 15 for providing connection to the thin-film coils 12 and 14.

In the step of forming the top pole layer 16, the four conductors 34 of the material same as the top pole layer 16 are formed by plating, for example, on the top shield gap film 7. Two of the four conductors 34 are each connected to the thin-film coils 12 and 14 of the element portion to be used through the intermediate terminal 37. The remaining two of the four conductors 34 are each connected to the electrode layer 6 of the element portion to be used through the contact hole 36 formed in the top shield gap film 7, and further connected to the MR element 5 of the element portion to be used through the electrode layer 6.

In the step of forming the top pole layer 16, the top pole layer 16 of the head element portion 31U or 31D which is to be used may be only formed.

Next, before forming the overcoat layer 17, the columnar electrodes (bumps) 33 are formed by plating, for example. The electrodes 33 are formed such that the lower ends thereof are connected to the conductors 34. The overcoat layer 17 is then formed to cover the electrodes 33. The top surface of the overcoat layer 17 is then ground to expose the top surfaces of the electrodes 33. Gold (Au) may be sputtered on the exposed top surfaces of the electrodes 33 for preventing oxidation (rusting), if necessary.

According to the method, the two types of thin-film magnetic heads are easily manufactured by preparing the only two types of photomasks corresponding to the patterns of the conductors 34 in the step of forming the top pole layer 16.

In the embodiment the intermediate product in a stage immediately before formation of the conductors 34, manufactured through the one series of steps, corresponds to a thin-film magnetic head material of the invention.

According to the embodiment thus described, the two thin-film magnetic head element portions 31U and 31D for the up type of the center element type and the down type of the center element type, respectively, are formed in the one slider, that is, the portion to be the main body of the thin-film magnetic head on the substrate. Selection between the up-type magnetic head for the center element type and the down-type magnetic head for the center element type is allowed by changing the pattern of the conductors 34 between the head element portions 31U and 31D and the electrodes 33. As a result, the embodiment allows the two head element portions 31U and 31D to be formed in advance through the one kind of process, that is, with the one kind of photomask. The intermediate product (the thin-film magnetic head material) thereby obtained may be kept as a stock common to the up type of the center element type and the down type of the center element type. On receiving an order from the customer, either the up-type magnetic head for the center element type or the down type magnetic head for the center element type may be manufactured, in response to the customer's demand, by changing part of the steps that follow, that is, by changing only some of the photomasks.

According to the embodiment thus described, it is possible to provide the thin-film magnetic head that meets specifications required by the customer in a short period of time. Furthermore, the embodiment allows most of the photomasks to be common to the up type of the center element type and the down type of the center element type. Mass-production lots and intermediate products are prevented from being wasted and manufacturing costs are reduced.

According to the embodiment, in the slider 25 having the first surface 25A and the second surface 25B facing the directions opposite to each other, the head element portion 31U for the up type of the center element type is placed such that the tip thereof faces the first surface 25A. The head element portion 31D for the down type of the center element type is placed such that the tip thereof faces the second surface 25B. The two head element portions 31U and 31D are each placed in symmetrical positions with respect to a plane parallel to the first surface 25A and the second surface 25B. As a result, both of the two head element portions 31U and 31D for the center element type are placed in the middle of the slider in the direction orthogonal to the direction of air flow. The thin-film magnetic head better suited for specifications required by the customer is thereby provided.

Figure 16:
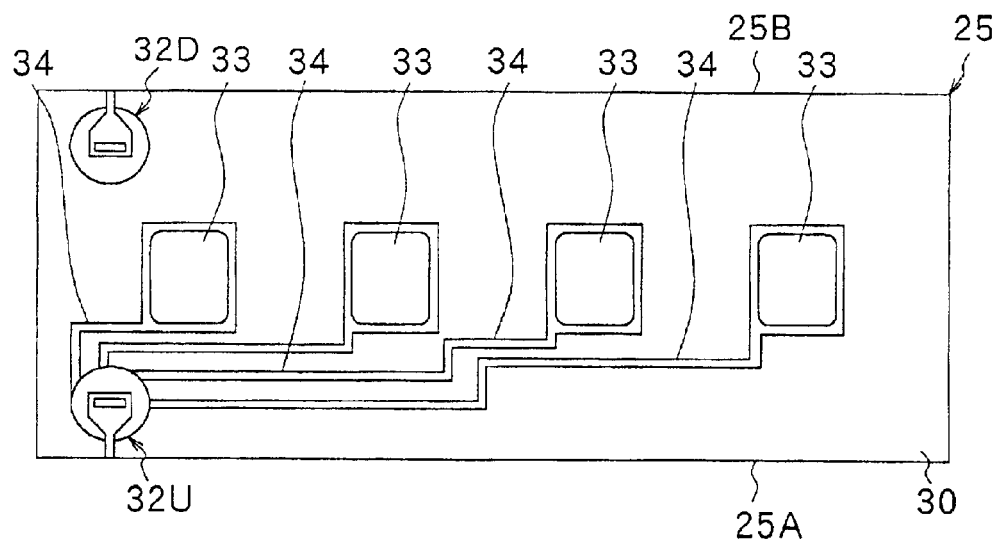
FIG. 16 is a schematic front view of the surface of the up type of the side element type slider of a second embodiment of the invention in which thin-film magnetic head element portions are formed.
Figure 17:
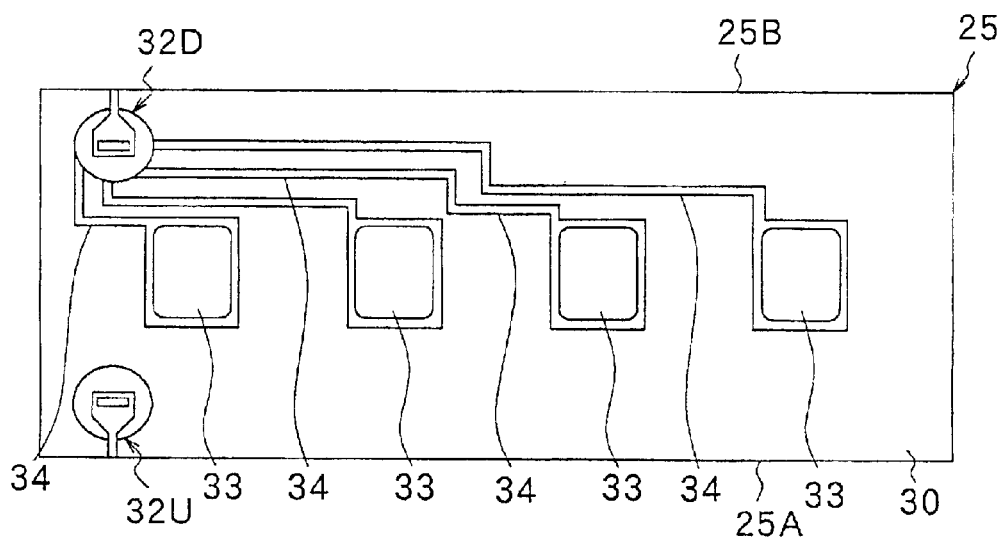
FIG. 17 is a schematic front view of the surface of the down type of the side element type slider of the second embodiment in which thin-film magnetic head element portions are formed.
Figure 18:
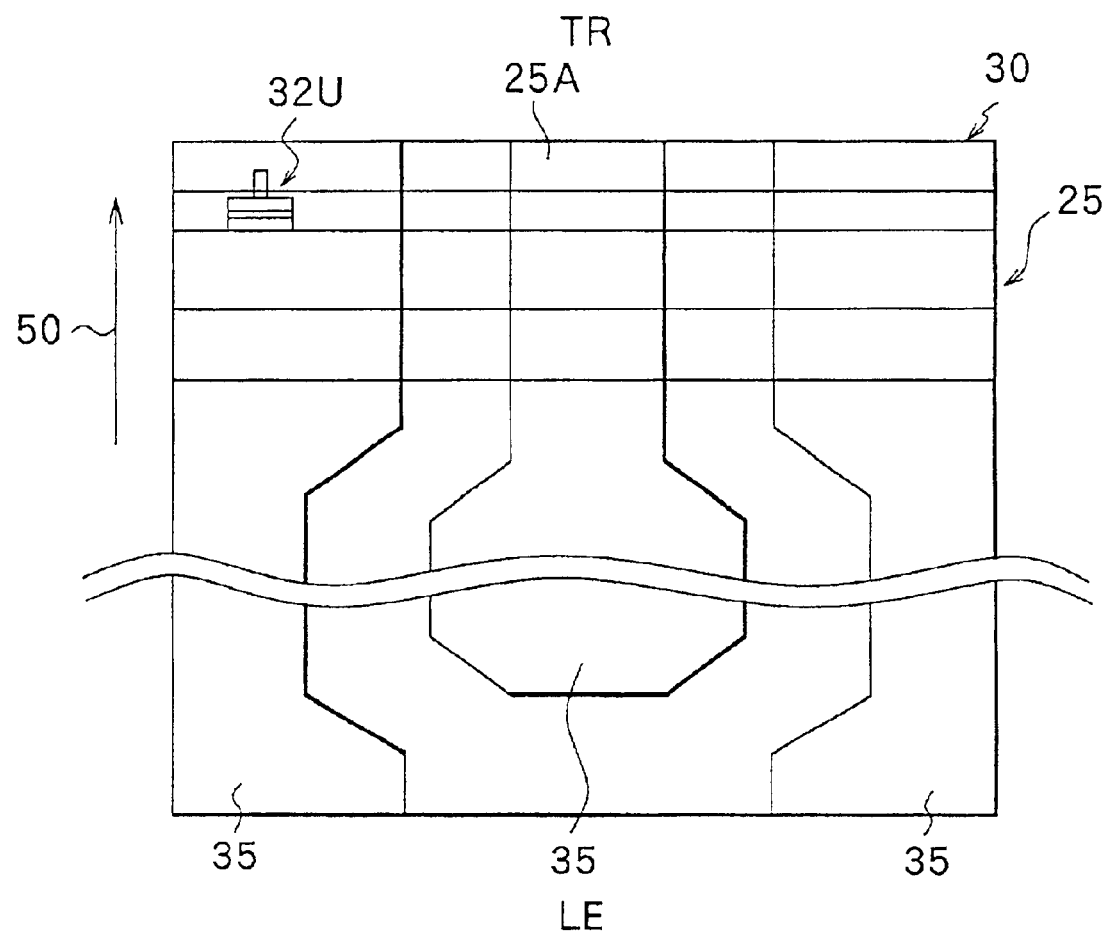
FIG. 18 is a schematic bottom view of the air bearing surface of the slider of the second embodiment.

Reference is now made to FIG. 16 to FIG. 18 for describing a thin-film magnetic head and a method of manufacturing the same, and a thin-film magnetic head material and a method of manufacturing the same of a second embodiment of the invention. According to the embodiment, two thin-film magnetic head element portions are formed in one slider, that is, a portion to be a main body of a thin-film magnetic head on a substrate. The two thin-film magnetic head element portions include a portion having the main part of an up-type thin-film magnetic head element for the side element type, and a portion having the main part of a down-type thin-film magnetic head element for the side element type. Selection between the up type of the side element type and the down type of the side element type is allowed by changing the pattern of conductors between the thin-film magnetic head element portions and electrodes.

FIG. 16 and FIG. 17 are schematic front views of the surface of the slider of the embodiment in which the thin-film magnetic head element portions are formed. FIG. 16 illustrates the up type of the side element type. FIG. 17 illustrates the down type of the side element type. FIG. 18 is a schematic bottom view of the air bearing surface of the slider of the embodiment. In FIG. 18 the arrow indicated with numeral 50 shows the direction of air flow. 'LE' indicates the air inflow end. 'TR' indicates the air outflow end.

As shown in FIG. 16 to FIG. 18, in the thin-film magnetic head of the embodiment, two thin-film magnetic head element portions 32U and 32D are formed near the end face 30 of the slider 25 orthogonal to the direction of air flow. The one thin-film magnetic head element portion 32U is provided for the up type of the side element type. The head element portion 32U is formed near one end (the left-hand end of FIG. 16) of the slider in the direction orthogonal to the direction of air flow so that the tip thereof faces the first surface 25A. The other thin-film magnetic head element portion 32D is provided for the down type of the side element type. The head element portion 32D is formed near the end (the left-hand end of FIG. 16) of the slider in the direction orthogonal to the direction of air flow so that the tip thereof faces the second surface 25B. The two head element portions 32U and 32D are each placed in symmetrical positions with respect to a plane parallel to the first surface 25A and the second surface 25B. An example of the basic configuration of the head element portions 32U and 32D is shown in FIG. 6A and FIG. 6B.

On the end face 30 the four pad-shaped electrodes 33 are provided for electrically connecting the head element portions 32U and 32D to an external device. The electrodes 33 are electrically connected to either the head element portion 32U or 32D through the four conductors 34. As shown in FIG. 16, if the head element portion 32U is connected to the electrodes 33 through the conductors 34, the up-type thin film magnetic head for the side element type is obtained. As shown in FIG. 17, if the head element portion 32D is connected to the electrodes 33 through the conductors 34, the down-type thin film magnetic head for the side element type is obtained.

FIG. 18 illustrates the up-type thin film magnetic head for the side element type wherein the head element portion 32U is used. In this case the first surface 25A functions as the air bearing surface. The second surface 25B functions as the air bearing surface for the down-type thin film magnetic head for the side element type wherein the head element portion 32D is used.

In the embodiment the intermediate product in a stage immediately before formation of the conductors 34, manufactured through the one series of steps, corresponds to the thin-film magnetic head material of the invention.

The remainder of the configuration, functions and effects of the second embodiment are similar to those of the first embodiment except those resulting from the difference between the center element type and the side element type.

Although the two head element portions 32U and 32D are placed near the left end of the end face 30 in FIG. 16 or FIG. 17, the element portions 32U and 32D may be placed near the right end of the end face 30.

Figure 19:
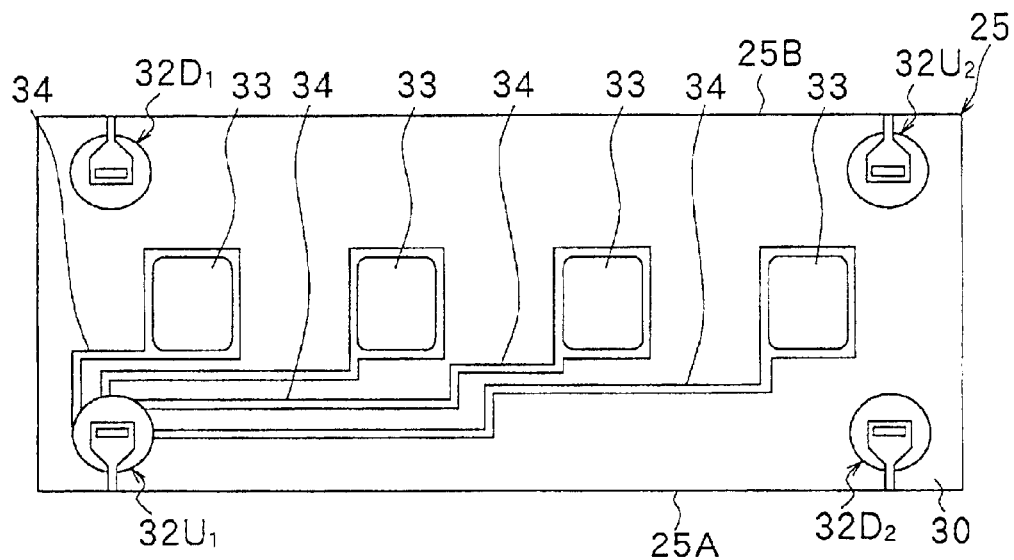
FIG. 19 is a schematic front view of the surface of the slider of a third embodiment in which thin-film magnetic head element portions are formed.
Figure 20:
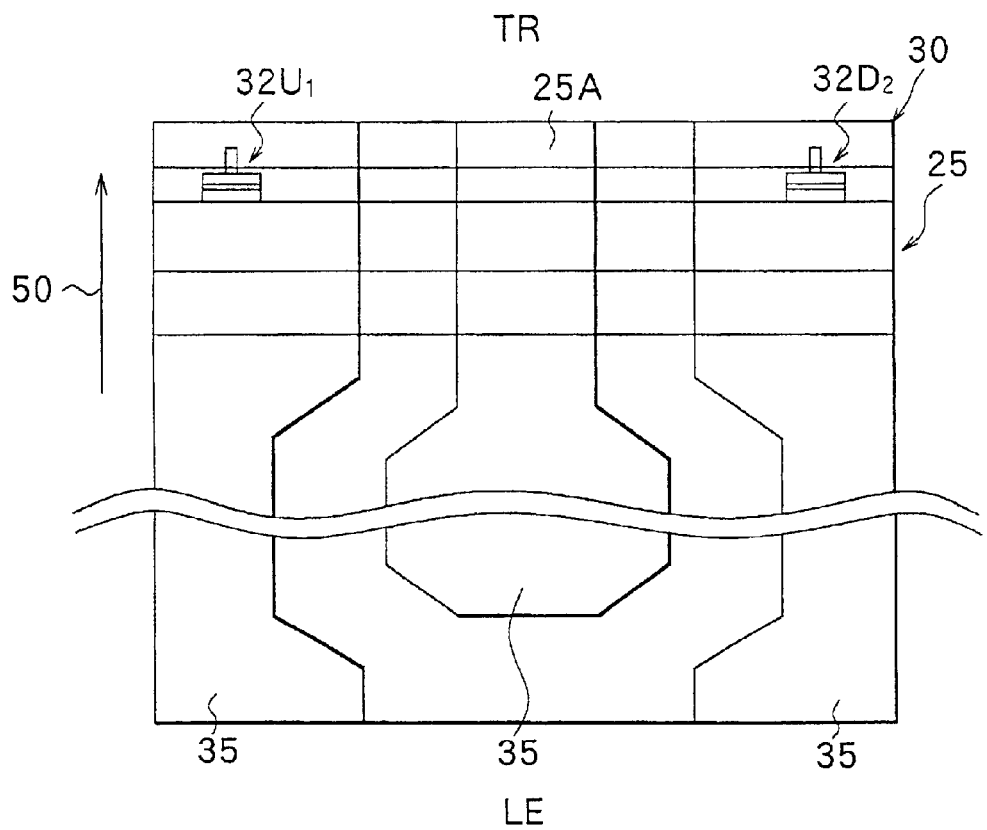
FIG. 20 is a schematic bottom view of the air bearing surface of the slider of the third embodiment.

Reference is now made to FIG. 19 and FIG. 20 for describing a thin-film magnetic head and a method of manufacturing the same, and a thin-film magnetic head material and a method of manufacturing the same of a third embodiment of the invention. According to the embodiment, four thin-film magnetic head element portions are formed in one slider, that is, a portion to be a main body of a thin-film magnetic head on a substrate. The four thin-film magnetic head element portions include two portions for the up type of the side element type, and two portions for the down type of the side element type. Selection between the up type of the side element type and the down type of the side element type is allowed by changing the pattern of conductors between the thin-film magnetic head element portions and electrodes.

FIG. 19 is a schematic front view of the surface of the slider of the embodiment in which the thin-film magnetic head element portions are formed. FIG. 20 is a schematic bottom view of the air bearing surface of the slider of the embodiment. In FIG. 20 the arrow indicated with numeral 50 shows the direction of air flow. 'LE' indicates the air inflow end. 'TR' indicates the air outflow end.

As shown in FIG. 19, in the thin-film magnetic head of the embodiment, four thin-film magnetic head element portions $32U_1$, $32D_1$, $32U_2$ and $32D_2$ are formed near the end face 30 of the slider 25 orthogonal to the direction of air flow. The thin-film magnetic head element portion $32U_1$ is provided for the up type of the side element type. The head element portion $32U_1$ is formed near one end (the left-hand end of FIG. 19) of the slider in the direction orthogonal to the direction of air flow so that the tip thereof faces the first surface 25A. The thin-film magnetic head element portion $32D_1$ is provided for the down type of the side element type. The head element portion $32D_1$ is formed near the end (the left-hand end of FIG. 19) of the slider in the direction orthogonal to the direction of air flow so that the tip thereof faces the second surface 25B. The thin-film magnetic head element portion $32U_2$ is provided for the up type of the side element type. The head element portion $32U_2$ is formed near the other end (the right-hand end of FIG. 19) of the slider in the direction orthogonal to the direction of air flow so that the tip thereof faces the second surface 25B. The thin-film magnetic head element portion $32D_2$ is provided for the down type of the side element type. The head element portion $32D_2$ is formed near the end (the right-hand end of FIG. 19) of the slider in the direction orthogonal to the direction of air flow so that the tip thereof faces the first surface 25A.

The two head element portions $32U_1$ and $32D_1$ are each placed in symmetrical positions with respect to a plane parallel to the first surface 25A and the second surface 25B. Similarly, the two head element portions $32U_2$ and $32D_2$ are each placed in symmetrical positions with respect to a plane parallel to the first surface 25A and the second surface 25B. An example of the basic configuration of the head element portions $32U_1$, $32D_1$, $32U_2$ and $32D_2$ is shown in FIG. 6A and FIG. 6B.

On the end face 30 the four pad-shaped electrodes 33 are provided for electrically connecting the head element portions $32U_1$, $32D_1$, $32U_2$ and $32D_2$ to an external device. The electrodes 33 are electrically connected to any of the head element portions $32U_1$, $32D_1$, $32U_2$ and $32D_2$ through the four conductors 34. FIG. 19 illustrates the case in which the head element portion $32U_1$ is connected to the electrodes 33 through the conductors 34. Any of the head elements $32D_1$, $32U_2$ and $32D_2$ may be connected to the electrodes 33 through the conductors 34 in a similar manner.

In the embodiment, if the head element portion $32U_1$ or $32U_2$ is connected to the electrodes 33 through the conductors 34, the up-type thin film magnetic head for the side element type is obtained. If the head element portion $32D_1$ or $32D_2$ is connected to the electrodes 33 through the conductors 34, the down-type thin film magnetic head for the side element type is obtained.

FIG. 20 illustrates the up-type thin film magnetic head for the side element type wherein the head element portion $32U_1$ is used or the down-type thin film magnetic head for the side element type wherein the head element portion $32D_2$ is used. In this case the first surface 25A functions as the air bearing surface. The second surface 25B functions as the air bearing surface for the up-type thin film magnetic head for the side element type wherein the head element portion $32U_2$ is used or the down-type thin film magnetic head for the side element type wherein the head element portion $32D_1$ is used.

In the embodiment the intermediate product in a stage immediately before formation of the conductors 34, manufactured through the one series of steps, corresponds to the thin-film magnetic head material of the invention.

In the embodiment the two head element portions $32U_1$ and $32U_2$ are provided for the up type of the side element type. The two head element portions $32D_1$ and $32D_2$ are provided for the down type of the side element type. As a result, even if one of the element portions $32U_1$ and $32U_2$ is defective, the up-type thin-film magnetic head for the side element type may be manufactured. Similarly, even if one of the element portions $32D_1$ and $32D_2$ is defective, the down-type thin-film magnetic head for the side element type may be manufactured. The embodiment therefore improves yields of the thin-film magnetic heads.

The remainder of the configuration, functions and effects of the second embodiment are similar to those of the second embodiment.

Figure 21:
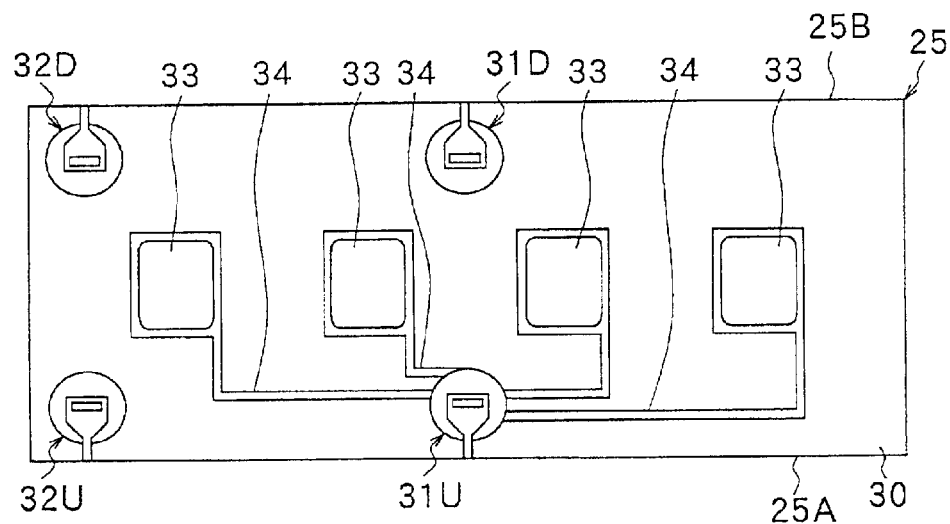
FIG. 21 is a schematic front view of the surface of the up type of the center element type slider of a fourth embodiment of the invention in which thin-film magnetic head element portions are formed.
Figure 25:
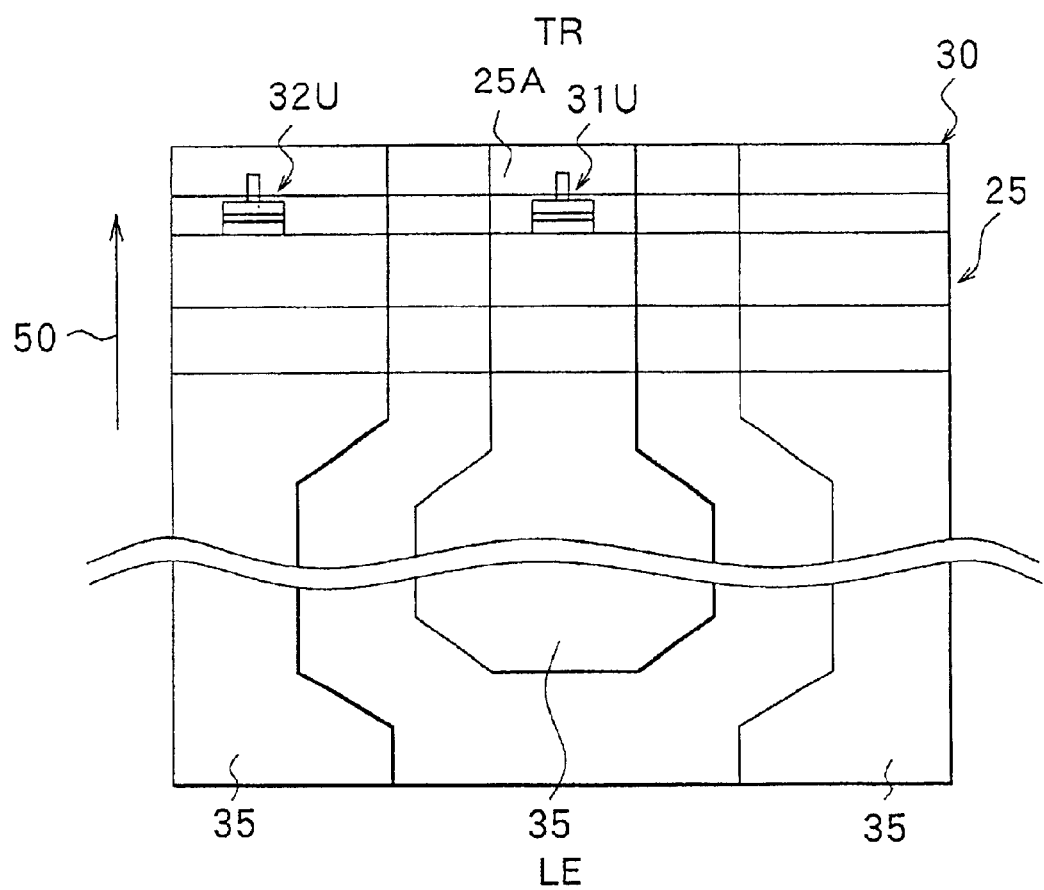
FIG. 25 is a schematic bottom view of the air bearing surface of the slider of the fourth embodiment.

Reference is now made to FIG. 21 and FIG. 25 for describing a thin-film magnetic head and a method of manufacturing the same, and a thin-film magnetic head material and a method of manufacturing the same of a fourth embodiment of the invention. According to the embodiment, four thin-film magnetic head element portions are formed in one slider, that is, a portion to be a main body of a thin-film magnetic head on a substrate. The four thin-film magnetic head element portions include a portion for the up type of the center element type, a portion for the down type of the center element type, a portion for the up type of the side element type, and a portion for the down type of the side element type. Selection of any of the four types is allowed by changing the pattern of conductors between the thin-film magnetic head element portions and electrodes.

Figure 22:
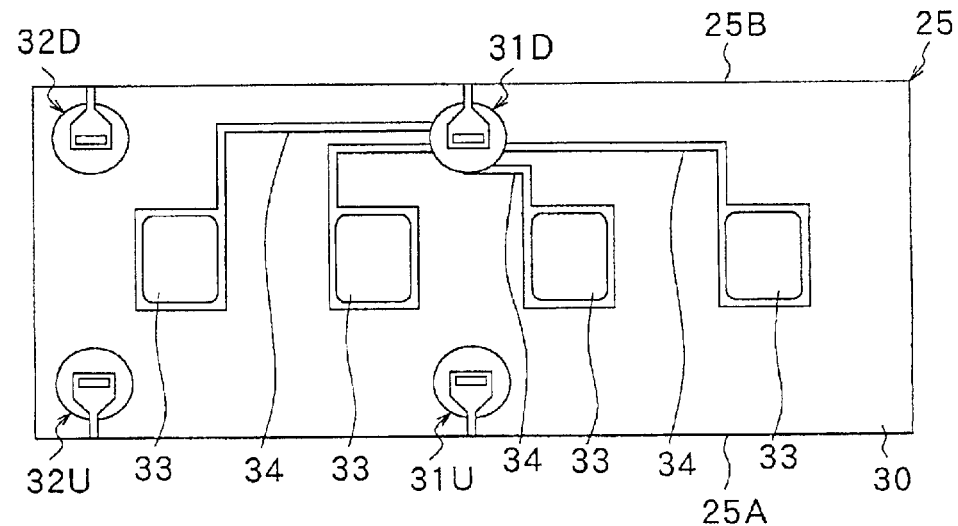
FIG. 22 is a schematic front view of the surface of the down type of the center element type slider of the fourth embodiment in which thin-film magnetic head element portions are formed.
Figure 23:
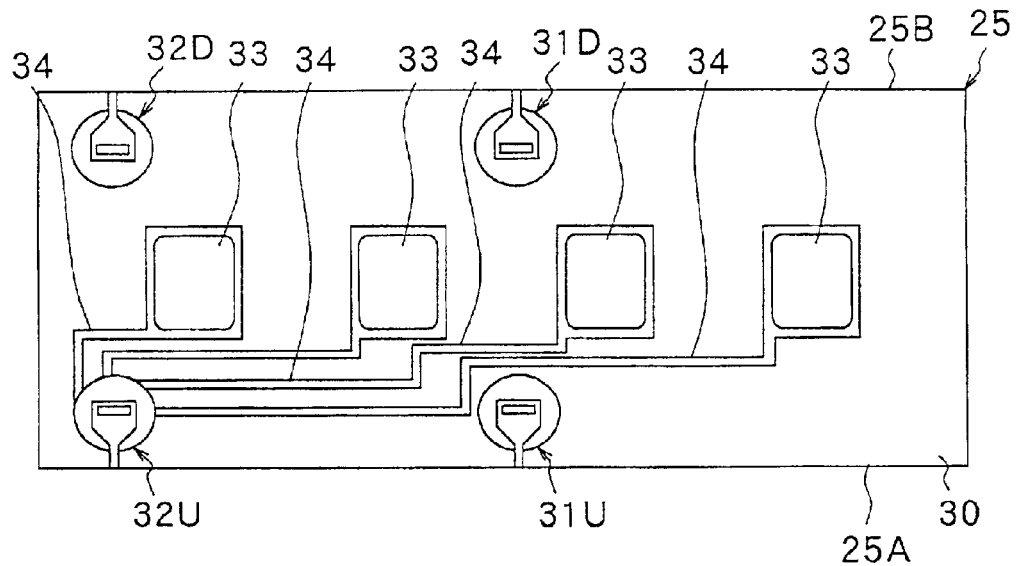
FIG. 23 is a schematic front view of the surface of the up type of the side element type slider of the fourth embodiment in which thin-film magnetic head element portions are formed.
Figure 24:
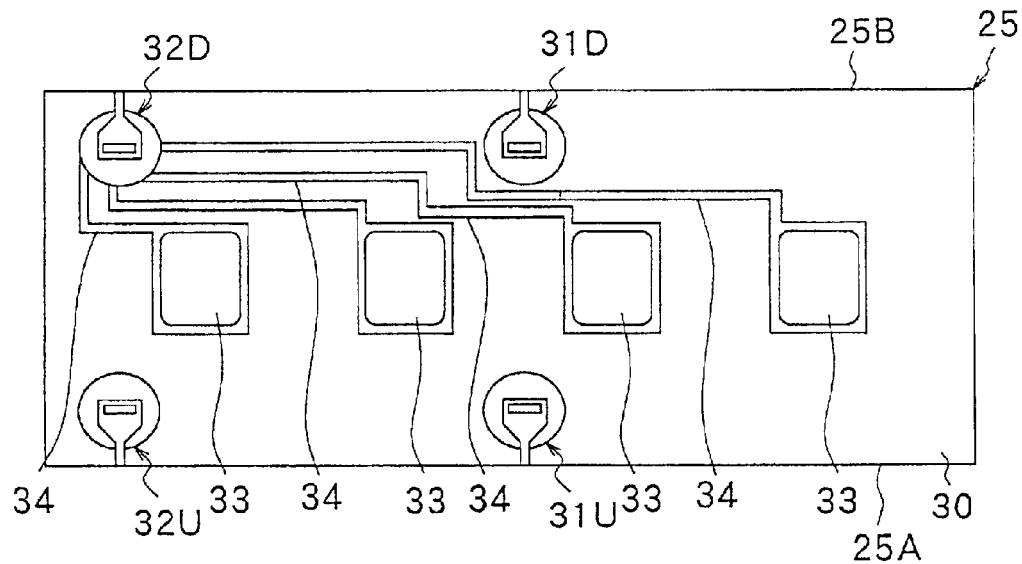
FIG. 24 is a schematic front view of the surface of the down type of the side element type slider of the fourth embodiment in which thin-film magnetic head element portions are formed.

FIG. 21 to FIG. 24 are schematic front views of the surface of the slider of the embodiment in which the thin-film magnetic head element portions are formed. FIG. 21 shows the up type of the center element type. FIG. 22 shows the down type of the center element type. FIG. 23 shows the up type of the side element type. FIG. 24 shows the down type of the side element type. FIG. 25 is a schematic bottom view of the air bearing surface of the slider of the embodiment. In FIG. 25 the arrow indicated with numeral 50 shows the direction of air flow. 'LE' indicates the air inflow end. 'TR' indicates the air outflow end.

As shown in FIG. 21 to FIG. 24, in the thin-film magnetic head of the embodiment, the four thin-film magnetic head element portions 31U, 31D, 32U and 32D are formed near the end face 30 of the slider 25 orthogonal to the direction of air flow. The thin-film magnetic head element portion 31U is provided for the up type of the center element type. The head element portion 31U is formed in the middle of the slider in the direction orthogonal to the direction of air flow so that the tip thereof faces the first surface 25A. The thin-film magnetic head element portion 31D is provided for the down type of the center element type. The head element portion 31D is formed in the middle of the slider in the direction orthogonal to the direction of air flow so that the tip thereof faces the second surface 25B. The thin-film magnetic head element portion 32U is provided for the up type of the side element type. The head element portion 32U is formed near one end (the left-hand end of the drawings) of the slider in the direction orthogonal to the direction of air flow so that the tip thereof faces the first surface 25A. The thin-film magnetic head element portion 32D is provided for the down type of the side element type. The head element portion 32D is formed near the end (the left-hand end of the drawings) of the slider in the direction orthogonal to the direction of air flow so that the tip thereof faces the second surface 25B.

The two head element portions 31U and 31D are each placed in symmetrical positions with respect to a plane parallel to the first surface 25A and the second surface 25B. Similarly, the two head element portions 32U and 32D are each placed in symmetrical positions with respect to a plane parallel to the first surface 25A and the second surface 25B. An example of the basic configuration of the head element portions 31U, 31D, 32U and 32D is shown in FIG. 6A and FIG. 6B.

On the end face 30 the four pad-shaped electrodes 33 are provided for electrically connecting the head element portions 31U, 31D, 32U and 32D to an external device. The electrodes 33 are electrically connected to any of the head element portions 31U, 31D, 32U and 32D through the four conductors 34.

As shown in FIG. 21, if the head element portion 31U is connected to the electrodes 33 through the conductors 34, the up-type thin film magnetic head for the center element type is obtained.

As shown in FIG. 22, if the head element portion 31D is connected to the electrodes 33 through the conductors 34, the down-type thin film magnetic head for the center element type is obtained.

As shown in FIG. 23, if the head element portion 32U is connected to the electrodes 33 through the conductors 34, the up-type thin film magnetic head for the side element type is obtained.

As shown in FIG. 24, if the head element portion 32D is connected to the electrodes 33 through the conductors 34, the down-type thin film magnetic head for the side element type is obtained.

FIG. 25 illustrates the up-type thin film magnetic head for the center element type wherein the head element portion 31U is used or the up-type thin film magnetic head for the side element type wherein the head element portion 32U is used. In this case the first surface 25A functions as the air bearing surface. The second surface 25B functions as the air bearing surface for the down-type thin film magnetic head for the center element type wherein the head element portion 31D is used or the down-type thin film magnetic head for the side element type wherein the head element portion 32D is used.

In the embodiment the intermediate product in a stage immediately before formation of the conductors 34, manufactured through the one series of steps, corresponds to the thin-film magnetic head material of the invention.

According to the embodiment, the four types of thin-film magnetic heads are easily manufactured by preparing only four types of photomasks in part of the manufacturing steps. The remainder of effects of the fourth embodiment are similar to those of the first embodiment.

Although the two head element portions 32U and 32D are placed near the left end of the end face 30 in FIG. 21 to FIG. 24, the element portions 32U and 32D may be placed near the right end of the end face 30.

Figure 26:
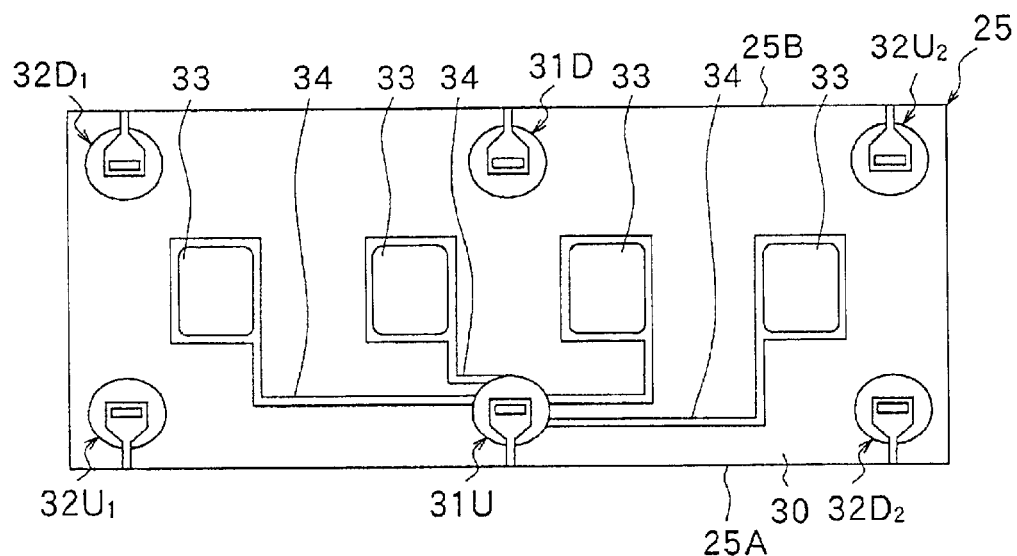
FIG. 26 is a schematic front view of the surface of the slider of a fifth embodiment in which thin-film magnetic head element portions are formed.
Figure 27:
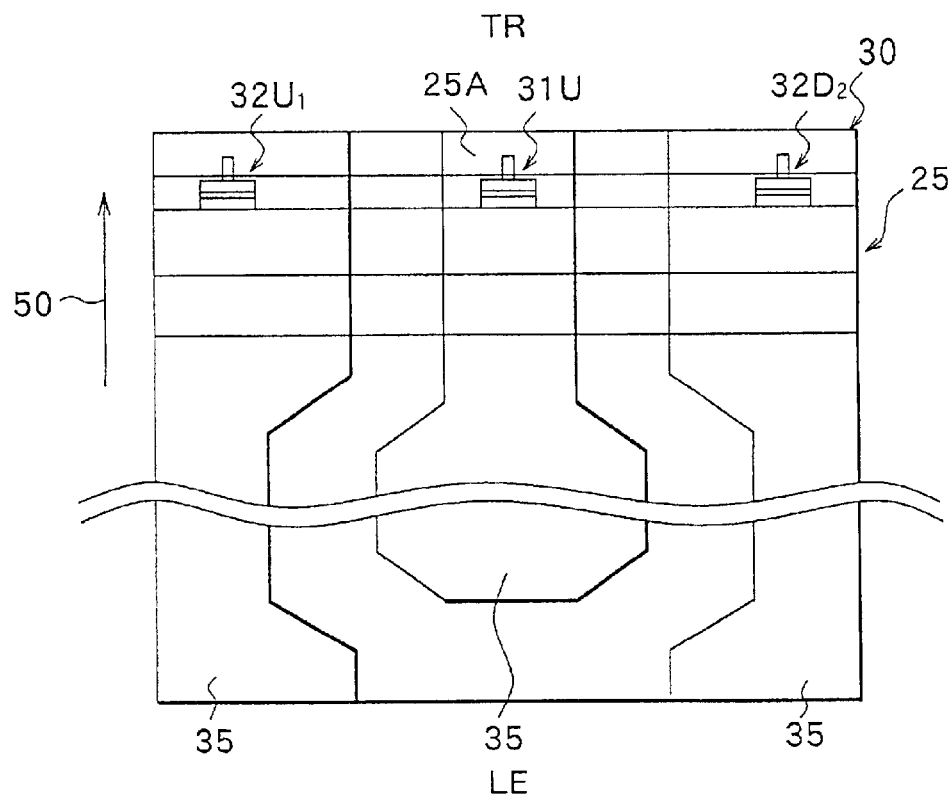
FIG. 27 is a schematic bottom view of the air bearing surface of the slider of the fifth embodiment.

Reference is now made to FIG. 26 and FIG. 27 for describing a thin-film magnetic head and a method of manufacturing the same, and a thin-film magnetic head material and a method of manufacturing the same of a fifth embodiment of the invention. According to the embodiment, six thin-film magnetic head element portions are formed in one slider, that is, a portion to be a main body of a thin-film magnetic head on a substrate. The six thin-film magnetic head element portions include a portion for the up type of the center element type, a portion for the down type of the center element type, two portions for the up type of the side element type, and two portions for the down type of the side element type. Selection of any of the four types is allowed by changing the pattern of conductors between the thin-film magnetic head element portions and electrodes.

FIG. 26 is a schematic front view of the surface of the slider of the embodiment in which the thin-film magnetic head element portions are formed. FIG. 27 is a schematic bottom view of the air bearing surface of the slider of the embodiment. In FIG. 27 the arrow indicated with numeral 50 shows the direction of air flow. 'LE' indicates the air inflow end. 'TR' indicates the air outflow end.

As shown in FIG. 26, in the thin-film magnetic head of the embodiment, the six thin-film magnetic head element portions 31U, 31D, 32U$_1$, 32D$_1$, 32U$_2$ and 32D$_2$ are formed near the end face 30 of the slider 25 orthogonal to the direction of air flow. The thin-film magnetic head element portion 31U is provided for the up type of the center element type. The head element portion 31U is formed in the middle of the slider in the direction orthogonal to the direction of air flow so that the tip thereof faces the first surface 25A. The thin-film magnetic head element portion 31D is provided for the down type of the center element type. The head element portion 31D is formed in the middle of the slider in the direction orthogonal to the direction of air flow so that the tip thereof faces the second surface 25B. The thin-film magnetic head element portion 32U$_1$ is provided for the up type of the side element type. The head element portion 32U$_1$ is formed near one end (the left-hand end of FIG. 26) of the slider in the direction orthogonal to the direction of air flow so that the tip thereof faces the first surface 25A. The thin-film magnetic head element portion 32D$_1$ is provided for the down type of the side element type. The head element portion 32D$_1$ is formed near the end (the left-hand end of FIG. 26) of the slider in the direction orthogonal to the direction of air flow so that the tip thereof faces the second surface 25B. The thin-film magnetic head element portion 32U$_2$ is provided for the up type of the side element type. The head element portion 32U$_2$ is formed near the other end (the right-hand end of FIG. 26) of the slider in the direction orthogonal to the direction of air flow so that the tip thereof faces the second surface 25B. The thin-film magnetic head element portion 32D$_2$ is provided for the down type of the side element type. The head element portion 32D$_2$ is formed near the end (the right-hand end of FIG. 26) of the slider in the direction orthogonal to the direction of air flow so that the tip thereof faces the first surface 25A.

The pair of head element portions 31U and 31D, the pair of element portions 32U$_1$ and 32D$_1$, and the pair of element portions 32U$_2$ and 32D$_2$ are each placed in symmetrical positions with respect to a plane parallel to the first surface 25A and the second surface 25B. An example of the basic configuration of the head element portions 31U, 31D, 32U$_1$, 32D$_1$, 32U$_2$ and 32D$_2$ is shown in FIG. 6A and FIG. 6B.

On the end face 30 the four pad-shaped electrodes 33 are provided for electrically connecting the head element portions 31U, 31D, 32U$_1$, 32D$_1$, 32U$_2$ and 32D$_2$ to an external device. The electrodes 33 are electrically connected to any of the head element portions 31U, 31D, 32U$_1$, 32D$_1$, 32U$_2$ and 32D$_2$ through the four conductors 34. FIG. 26 illustrates the case in which the head element portion 31U is connected to the electrodes 33 through the conductors 34. Any of the head elements 31D, 32U$_1$, 32D$_1$, 32U$_2$ and 32D$_2$ may be connected to the electrodes 33 through the conductors 34 in a similar manner.

In the embodiment, if the head element portion 31U is connected to the electrodes 33 through the conductors 34, the up-type thin film magnetic head for the center element type is obtained. If the head element portion 31D is connected to the electrodes 33 through the conductors 34, the down-type thin film magnetic head for the center element type is obtained. If the head element portion 32U$_1$ or 32U$_2$ is connected to the electrodes 33 through the conductors 34, the up-type thin film magnetic head for the side element type is obtained. If the head element portion 32D$_1$ or 32D$_2$ is connected to the electrodes 33 through the conductors 34, the down-type thin film magnetic head for the side element type is obtained.

FIG. 27 illustrates the up-type thin film magnetic head for the center element type wherein the head element portion 31U is used, the up-type thin film magnetic head for the side element type wherein the head element portion 32U$_1$ is used, or the down-type thin film magnetic head for the side element type wherein the head element portion 32D$_2$ is used. In this case the first surface 25A functions as the air bearing surface. The second surface 25B functions as the air bearing surface for the down-type thin film magnetic head for the center element type wherein the head element portion 31D is used, the up-type thin film magnetic head for the side element type wherein the head element portion 32U$_2$ is used, or the down-type thin film magnetic head for the side element type wherein the head element portion 32D$_1$ is used.

In the embodiment the intermediate product in a stage immediately before formation of the conductors 34, manufactured through the one series of steps, corresponds to the thin-film magnetic head material of the invention.

According to the embodiment, as in the third embodiment, the two head element portions 32U$_1$ and 32U$_2$ are provided for the up type of the side element type. The two head element portions 32D$_1$ and 32D$_2$ are provided for the down type of the side element type. Yields of the thin-film magnetic heads are thereby improved.

The remainder of configuration, functions and effects of the fifth embodiment are similar to those of the fourth embodiment.

Figure 28:
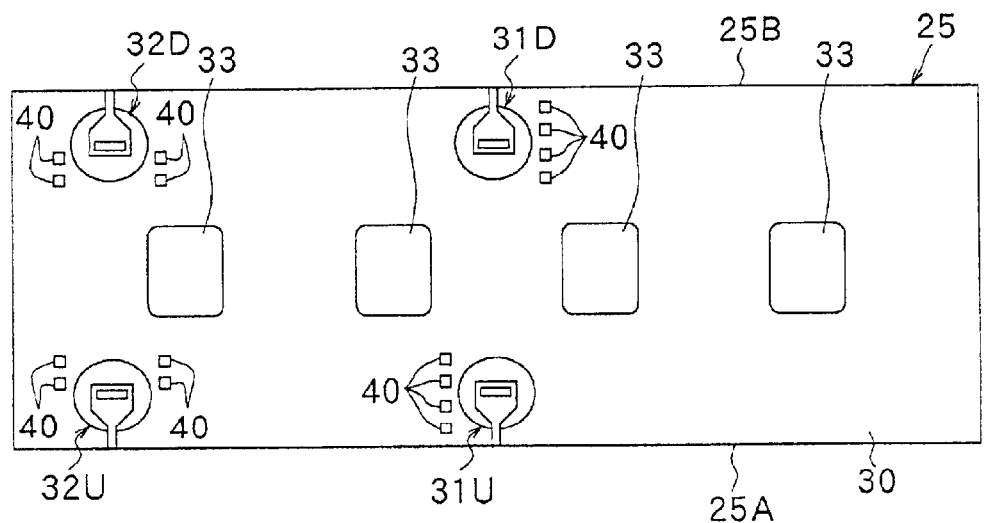
FIG. 28 is a schematic front view of the surface of the slider of a sixth embodiment in which thin-film magnetic head element portions are formed.
Figure 33:
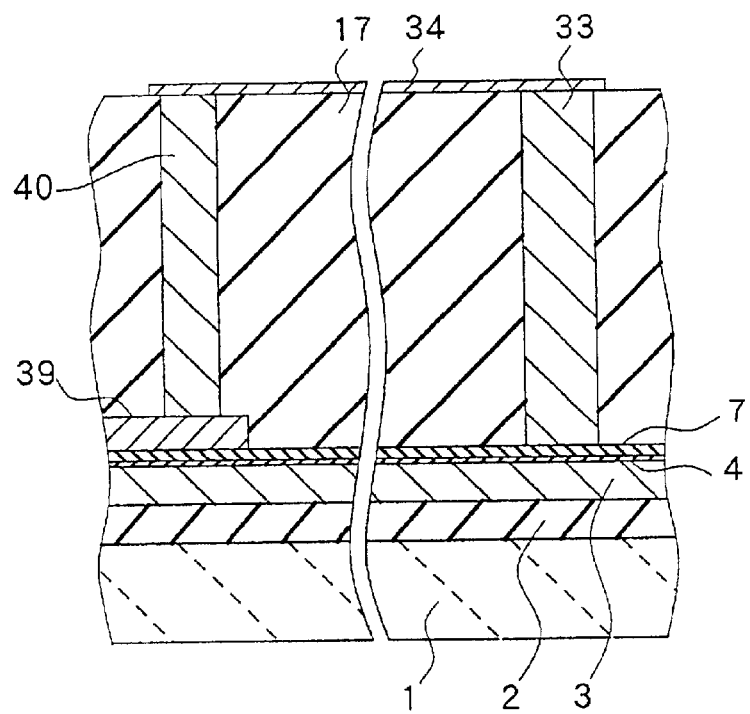
FIG. 33 is a cross section for describing a method of forming the conductors and electrodes of the sixth embodiment.

Reference is now made to FIG. 28 and FIG. 33 for describing a thin-film magnetic head and a method of manufacturing the same, and a thin-film magnetic head material and a method of manufacturing the same of a sixth embodiment of the invention. According to the embodiment, as in the fourth embodiment, the four thin-film magnetic head element portions are formed in one slider, that is, a portion to be a main body of a thin-film magnetic head on a substrate. The four thin-film magnetic head element portions include a portion for the up type of the center element type, a portion for the down type of the center element type, a portion for the up type of the side element type, and a portion for the down type of the side element type. Selection of any of the four types is allowed by changing the pattern of conductors between the thin-film magnetic head element portions and electrodes.

FIG. 28 is a schematic front view of the surface of the slider of the embodiment in which the thin-film magnetic head element portions are formed. FIG. 28 shows the state immediately before formation of the conductors. As shown, in the thin-film magnetic head of the embodiment, the four thin-film magnetic head element portions 31U, 31D, 32U and 32D are formed near the end face 30 of the slider 25 orthogonal to the direction of air flow, as in the fourth embodiment. On the end face 30 the four pad-shaped electrodes 33 are provided for electrically connecting the head element portions 31U, 31D, 32U and 32D to an external device. In the thin-film magnetic head of the embodiment, four intermediate connecting portions 40 are further provided in the end face 30 for the respective element portions 31U, 31D, 32U and 32D in the neighborhood thereof. The intermediate connecting portions 40 are connected to the element portions 31U, 31D, 32U and 32D. The conductors 34 are selectively connected to the intermediate connecting portions 40.

In the embodiment, the top surfaces of the intermediate connecting portions 40 and the electrodes 33 are exposed from the end face 30 before the conductors 34 are formed. Any of the four types of magnetic heads is obtained by selectively connecting the electrodes 33 to the intermediate connecting portion 40 of any of the element portions 31U, 31D, 32U and 32D through the conductors 34.

Figure 29:
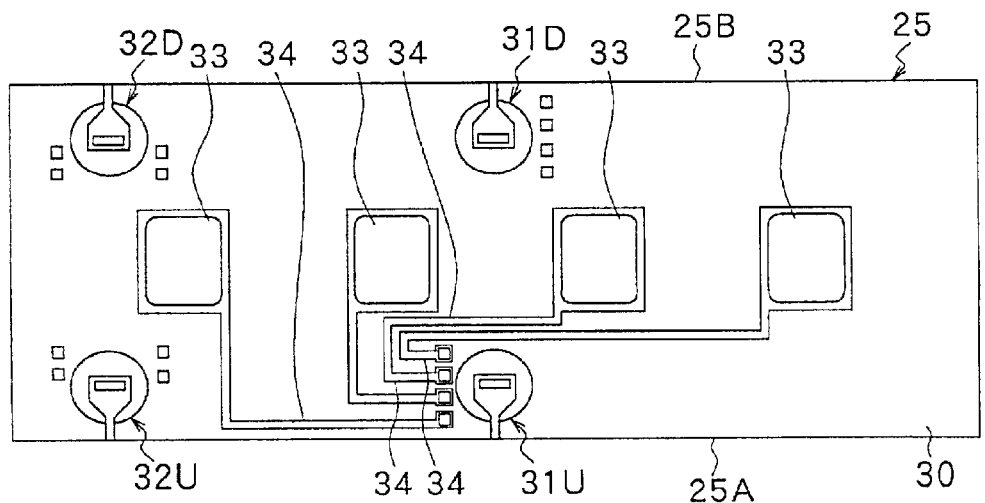
FIG. 29 is a schematic front view of the surface of the up type of the center element type slider of the sixth embodiment in which thin-film magnetic head element portions are formed.

As shown in FIG. 29, if the intermediate connecting portion 40 of the head element portion 31U is connected to the electrodes 33 through the conductors 34, the up-type thin film magnetic head for the center element type is obtained.

Figure 30:
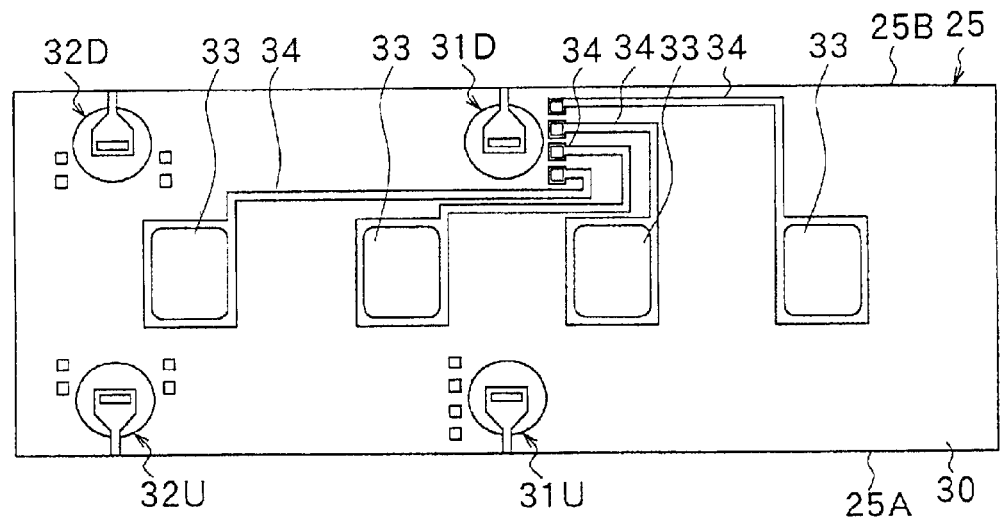
FIG. 30 is a schematic front view of the surface of the down type of the center element type slider of the sixth embodiment in which thin-film magnetic head element portions are formed.

As shown in FIG. 30, if the intermediate connecting portion 40 of the head element portion 31D is connected to the electrodes 33 through the conductors 34, the down-type thin film magnetic head for the center element type is obtained.

Figure 31:
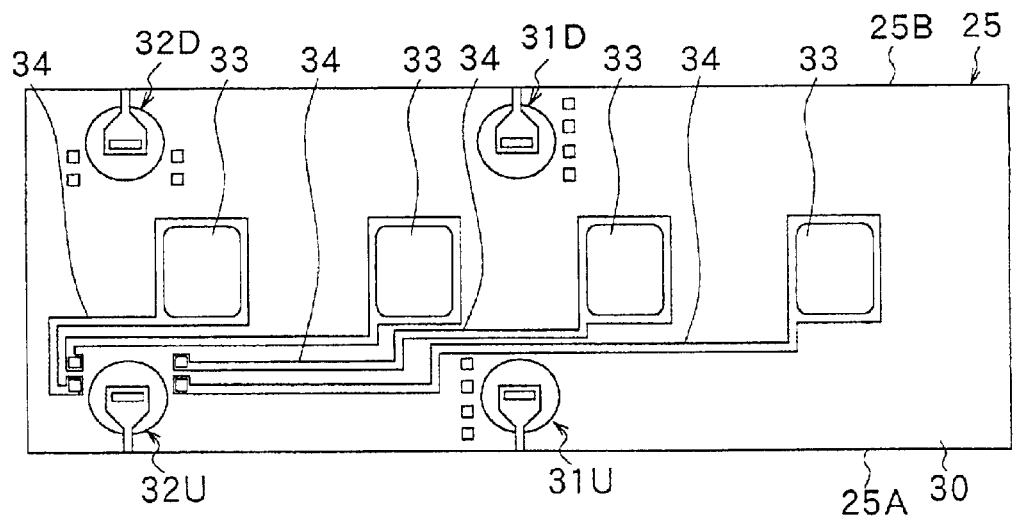
FIG. 31 is a schematic front view of the surface of the up type of the side element type slider of the sixth embodiment in which thin-film magnetic head element portions are formed.

As shown in FIG. 31, if the intermediate connecting portion 40 of the head element portion 32U is connected to the electrodes 33 through the conductors 34, the up-type thin film magnetic head for the side element type is obtained.

Figure 32:
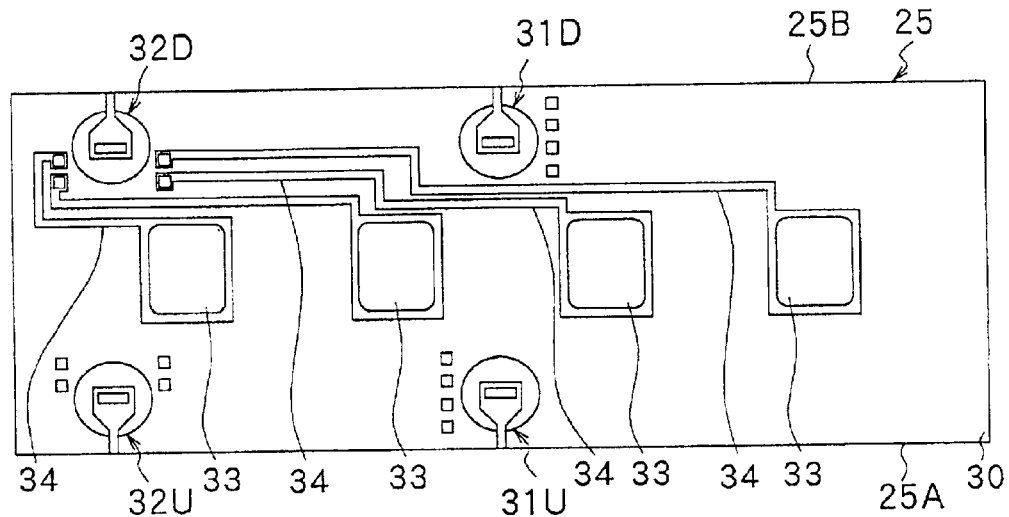
FIG. 32 is a schematic front view of the surface of the down type of the side element type slider of the sixth embodiment in which thin-film magnetic head element portions are formed.

As shown in FIG. 32, if the intermediate connecting portion 40 of the head element portion 32D is connected to the electrodes 33 through the conductors 34, the down-type thin film magnetic head for the side element type is obtained.

Reference is now made to FIG. 33 for describing a method of forming the intermediate connecting portions 40, the electrodes 33 and the conductors 34 of the embodiment.

In the embodiment, in the steps of forming the thin-film coils 12 and 14, intermediate terminals 39 are formed near the element portions 31U, 31D, 32U and 32D. The intermediate terminals 39 are connected to the thin-film coils 12 and 14 of each of the element portions 31U, 31D, 32U and 32D. The intermediate connecting portions 40 are connected to the intermediate terminals 39. The arrangement of the intermediate terminals 39 is similar to that of the intermediate terminals 37 of the first embodiment. In place of the intermediate terminals 39, contact holes may be formed in the photoresist layers 13 and 15 for providing connection to the thin-film coils 12 and 14.

In the embodiment, after the top pole layer 16 of each of the element portions 31U, 31D, 32U and 32D is formed, and before the overcoat layer 17 is formed, the columnar electrodes (bumps) 33 and the columnar intermediate connecting portions 40, each made of copper, for example, are formed by plating, for example. The lower ends of two of the four intermediate connecting portions 40 are connected to the thin-film coils 12 and 14 through the intermediate terminals 39 or the contact holes. The remaining two of the four intermediate connecting portions 40 are each connected to the electrode layer 6 through the contact hole similar to the contact hole 36 of the first embodiment, and further connected to the MR element 5 through the electrode layer 6.

The overcoat layer 17 is then formed to cover the electrodes 33 and the intermediate connecting portions 40. The top surface of the overcoat layer 17 is ground to expose the top surface of the electrodes 33 and the intermediate connecting portions 40.

Finally, the conductors 34 are formed on the overcoat layer 17 for connecting the electrodes 33 to the intermediate connecting portion 40 of any of the element portions 31U, 31D, 32U and 32D. The conductors 34 may be formed through sputtering of a conductive material and then patterning the material, using the photomask. If necessary, a protection film may be formed over the conductors 34 except the pad portions used for connection to an external device. Gold (Au) may be sputtered on the pad portions of the conductors 34 for preventing oxidation (rusting).

In the embodiment the intermediate product in a stage immediately before formation of the conductors 34, manufactured through the one series of steps, corresponds to the thin-film magnetic head material of the invention.

According to the embodiment thus described, the thin-film magnetic head material is formed through the one kind of process, that is, with the one kind of photomask up to the formation of the overcoat layer 17. On receiving an order from the customer, the conductors 34 are manufactured, in response to the customer's demand, by changing the photomasks for forming the conductors 34 only. The thin-film magnetic head that meets the customer's demand is thereby manufactured. The embodiment thus allows the thin-film magnetic heads that meet specifications required by the customer to be supplied in a brief period of time.

The remainder of configuration, functions and effects of the sixth embodiment are similar to those of the fourth embodiment.

Although the two head element portions 32U and 32D are placed near the left end of the end face 30 in FIG. 28 to FIG. 32, the element portions 32U and 32D may be placed near the right end of the end face 30.

Figure 34:
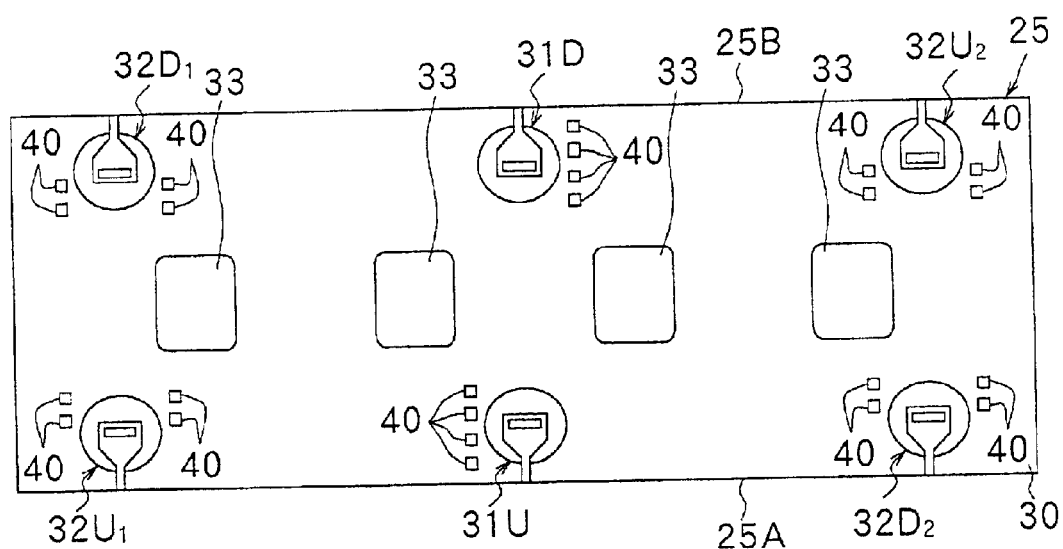
FIG. 34 is a schematic front view of the surface of the slider of a seventh embodiment in which thin-film magnetic head element portions are formed.
Figure 35:
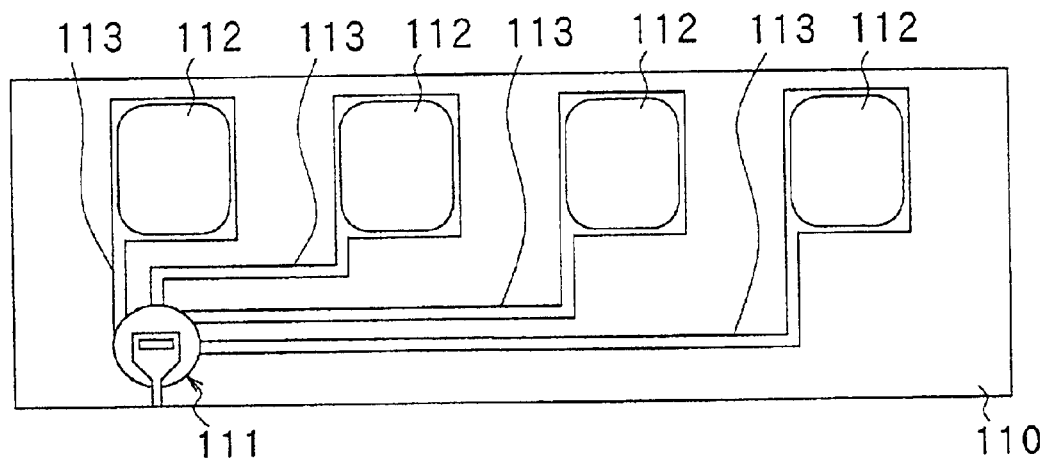
FIG. 35 is a schematic front view of the surface of the side element type slider of related art in which thin-film magnetic head element portions are formed.
Figure 36:
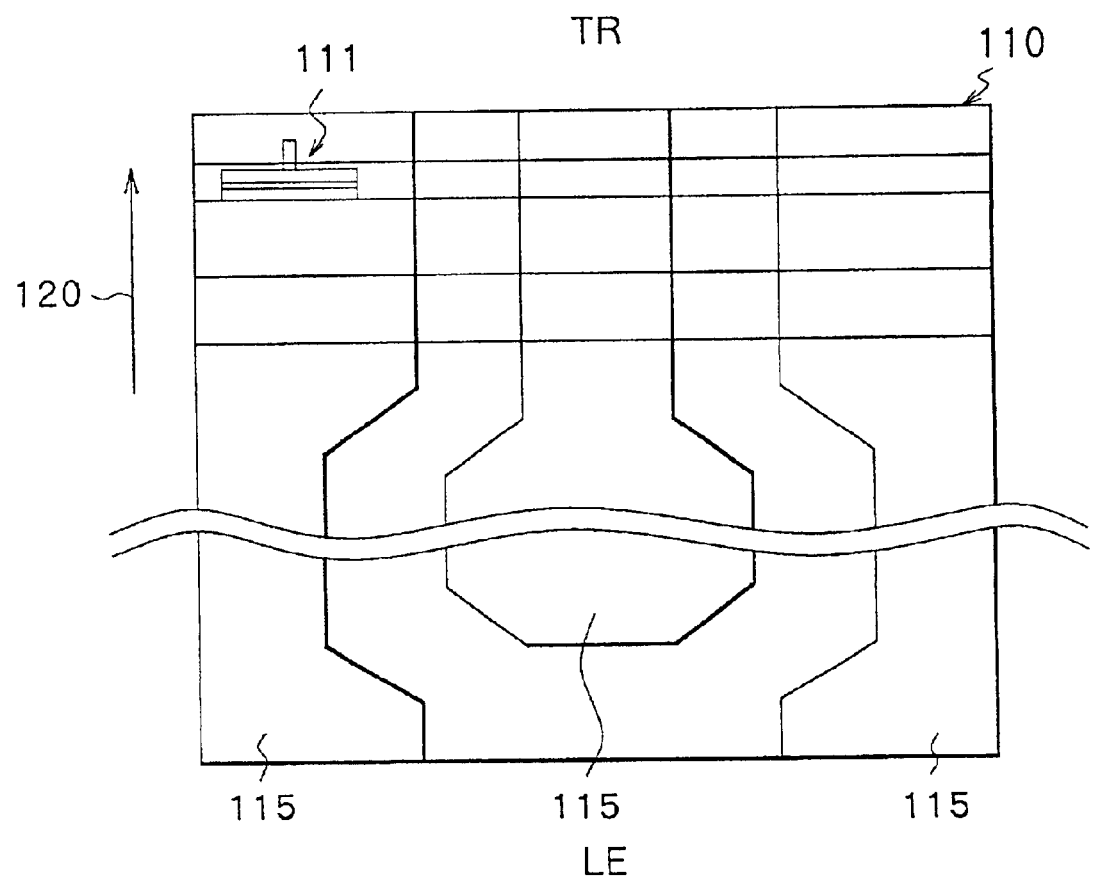
FIG. 36 is a schematic bottom view of the air bearing surface of the side element type slider of related art.
Figure 37:
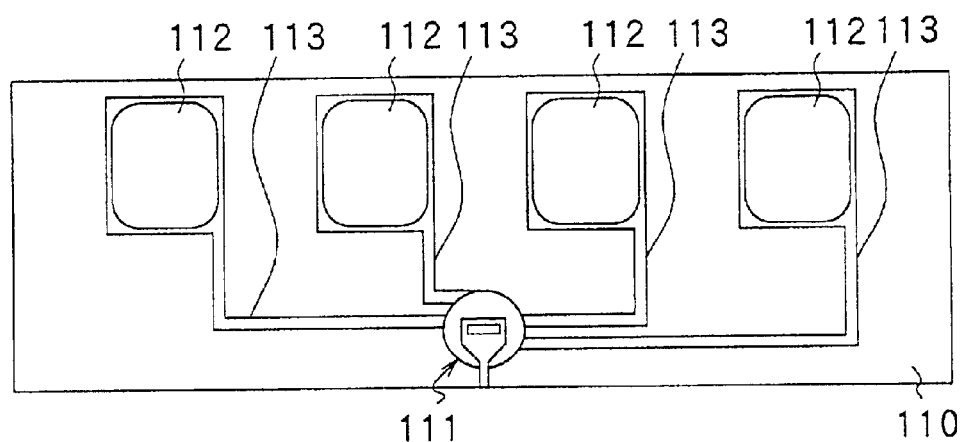
FIG. 37 is a schematic front view of the surface of the center element type slider of related art in which thin-film magnetic head element portions are formed.
Figure 38:
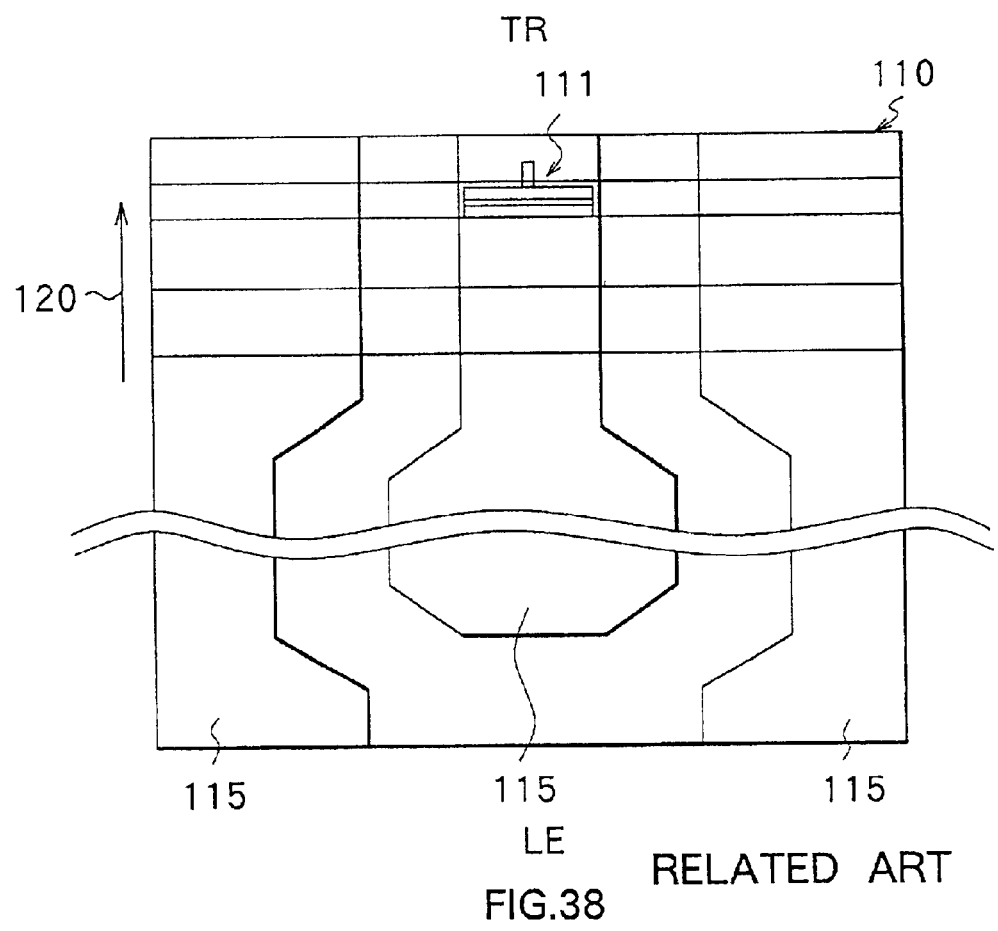
FIG. 38 is a schematic bottom view of the air bearing surface of the center element type slider of related art.
Figure 39:
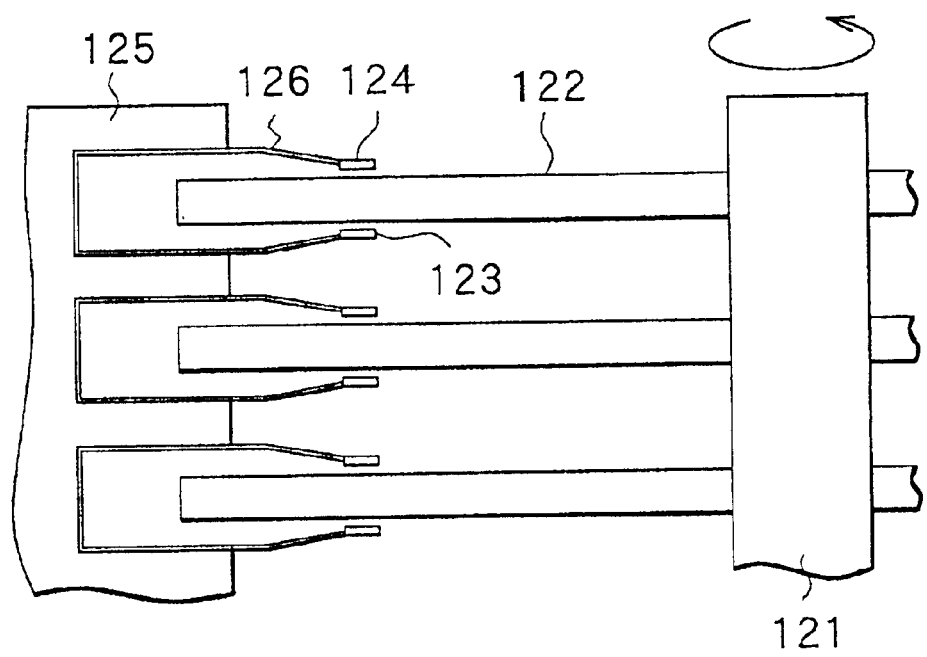
FIG. 39 is an explanatory view for illustrating the arrangement of the thin-film magnetic heads in the hard disk drive in which a plurality of platters are used.

Reference is now made to FIG. 34 for describing a thin-film magnetic head and a method of manufacturing the same, and a thin-film magnetic head material and a method of manufacturing the same of a seventh embodiment of the invention. According to the embodiment, six thin-film magnetic head element portions are formed in one slider, that is, a portion to be a main body of a thin-film magnetic head on a substrate. The six thin-film magnetic head element portions include a portion for the up type of the center element type, a portion for the down type of the center element type, two portions for the up type of the side element type, and two portions for the down type of the side element type. Selection of any of the four types is allowed by changing the pattern of conductors between the thin-film magnetic head element portions and electrodes.

FIG. 34 is a schematic front view of the surface of the slider of the embodiment in which the thin-film magnetic head element portions are formed. FIG. 34 illustrates the state immediately before the conductors are formed. As shown, in the thin-film magnetic head of the embodiment, the six thin-film magnetic head element portions 31U, 31D, $32U_1$, $32D_1$, $32U_2$ and $32D_2$ are formed near the end face 30 of the slider 25 orthogonal to the direction of air flow, as in the fifth embodiment. On the end face 30 the four pad-shaped electrodes 33 are provided for electrically connecting the head element portions 31U, 31D, $32U_1$, $32D_1$, $32U_2$ and $32D_2$ to an external device. In the thin-film magnetic head of the embodiment, the four intermediate connecting portions 40 are further provided in the end face 30 for the respective element portions 31U, 31D, $32U_1$, $32D_1$, $32U_2$ and $32D_2$ in the neighborhood thereof. The intermediate connecting portions 40 are connected to the element portions 31U, 31D, $32U_1$, $32D_1$, $32U_2$ and $32D_2$. The conductors 34 are selectively connected to the intermediate connecting portions 40.

In the embodiment, the top surfaces of the intermediate connecting portions 40 and the electrodes 33 are exposed from the end face 30 before the conductors 34 are formed. Any of the four types of magnetic heads is obtained by selectively connecting the electrodes 33 to the intermediate connecting portion 40 of any of the element portions 31U, 31D, $32U_1$, $32D_1$, $32U_2$ and $32D_2$ through the conductors 34.

According to the embodiment, as in the third and fifth embodiments, the two head element portions $32U_1$ and $32U_2$ are provided for the up type of the side element type. The two head element portions $32D_1$ and $32D_2$ are provided for the down type of the side element type. Yields of the thin-film magnetic heads are thereby improved.

The remainder of configuration, functions and effects of the seventh embodiment are similar to those of the sixth embodiment.

The invention is not limited to the foregoing embodiments but may be practiced in still other ways. For example, the ends of the conductors 34 may function as electrodes, too, in the sixth or seventh embodiment, instead of providing the columnar electrodes 33.

Although the composite thin-film magnetic heads are described in the foregoing embodiments, the embodiments may be applied to a thin-film magnetic head dedicated to reproduction, a thin-film magnetic head dedicated to recording, a thin-film magnetic head for recording and reproduction through the use of an induction magnetic transducer, and so on.

The configuration and the manufacturing method of the thin-film magnetic head or the thin-film magnetic head material may be any configuration and method other than those illustrated in the foregoing embodiments within the scope of the invention. For example, the geometry of the medium facing surface (the geometry of the rail, to be specific) may be of any kind.

The arrangement of the thin-film magnetic heads is not limited to the center element type and the side element type described in the foregoing embodiments.

In the foregoing embodiments, if a GMR element is used for the MR element 5 and it is required to determine a specific direction of magnetization of the magnetic film of the GMR element, one or some of a plurality of element portions to use may be selected in advance. The direction of magnetization of the magnetic film of the GMR element of each element portion may be determined so that the specific direction of magnetization of the magnetic film of the selected element portion(s) is obtained.

According to the thin-film magnetic head or the method of manufacturing the thin-film magnetic head of the invention thus described, one of a plurality of thin-film magnetic head element portions is selectively and electrically connected to the electrodes through the conductors. As a result, thin-film magnetic heads meeting specifications required by the customer are provided in a short period of time and manufacturing costs are reduced. According to the thin-film magnetic head or the method of manufacturing the thin-film magnetic head of the invention, in the main body having the first surface and the second surface facing directions opposed to each other, the first thin-film magnetic head element portion is placed such that the tip thereof faces the first surface and the second thin-film magnetic head element portion is placed such that the tip thereof faces the second surface. As a result, thin-film magnetic heads better suited for specifications required by the customer are provided.

According to the thin-film magnetic head material or the method of manufacturing the thin-film magnetic head material of the invention, a material comprising a plurality of element portions may be manufactured. Selected one of the element portions is electrically connected to the electrodes through the conductors, using the material. As a result, thin-film magnetic heads of several types of specifications may be selectively manufactured. As a result, thin-film magnetic heads meeting specifications required by the customer are provided in a short period of time and manufacturing costs are reduced. According to the thin-film magnetic head material or the method of manufacturing the thin-film magnetic head material of the invention, in the section to be the main body having the first surface and the second surface facing directions opposed to each other, the first thin-film magnetic head element portion is placed such that the tip thereof faces the first surface and the second thin-film magnetic head element portion is placed such that the tip thereof faces the second surface. As a result, thin-film magnetic heads better suited for specifications required by the customer are provided.

Obviously many modifications and variations of the present invention are possible in the light of the above teachings. It is therefore to be understood that within the scope of the appended claims the invention may be practiced otherwise than as specifically described.

What is claimed is:

1. A method of manufacturing a thin-film magnetic head, including the steps of:

forming a plurality of thin-film magnetic head element portions in a section to be a main body wherein a thin-film magnetic head element is to be formed in a substrate, the section having a first surface and a second surface facing directions opposed to each other, the element portions including at least one first thin-film magnetic head element portion having a pole tip that faces the first surface and at least one second thin-film magnetic head element portion having a pole tip that faces the second surface;

forming a plurality of electrodes, in the section to be the main body, to be provided for a single thin-film magnetic head element portion, each of the plurality of electrodes for electrically connecting any one of the element portions to an external device; and forming a plurality of conductors, in the section to be the main body, for electrically connecting either the at least one first thin-film magnetic head element portion or the at least one second thin-film magnetic head element portion to the electrodes, the other of the at least one first thin-film magnetic head element portion or the at least one second thin-film magnetic head element portion is not connected to the electrodes.

2. A method of manufacturing a thin-film magnetic head according to claim 1 wherein the at least one first thin-film magnetic head element portion and the at least one second thin-film magnetic head element portion are placed in symmetrical positions with respect to a plane parallel to the first and second surfaces in the step of forming the element portions.

3. A method of manufacturing a thin-film magnetic head according to claim 1 wherein the step of forming the electrodes is performed after the step of forming the conductors.

4. A method of manufacturing a thin-film magnetic head according to claim 1 wherein the step of forming the electrodes is performed before the step of forming the conductors.

5. A method of manufacturing a thin-film magnetic head according to claim 1 wherein:

the thin-film magnetic head element portions each comprise: an induction-type magnetic transducer having first and second magnetic layers magnetically connected to each other and each made up of at least one layer and including pole portions parts of which facing a recording medium are opposed to each other with a recording gap layer in between, and thin-film coil placed between the first and second magnetic layers; and the conductors are connected to the thin-film coil; and the step of forming the element portions includes the steps of forming the first magnetic layer, forming the thin-film coil on the first magnetic layer, and forming the second magnetic layer on the thin-film coil.

6. A method of manufacturing a thin-film magnetic head according to claim 1 wherein the thin-film magnetic head element portions each comprise a magnetoresistive element; and the conductors are connected to the magnetoresistive element.

7. A method of manufacturing a thin-film magnetic head according to claim 1, further including, before the step of forming the conductors, the step of forming intermediate connecting portions for the respective thin-film magnetic head element portions, connected to the element portions, to which the conductors are selectively connected; wherein the conductors are connected to the intermediate connecting portion corresponding to selected one of the element portions.

8. A method of manufacturing a thin-film magnetic head according to claim 5 wherein the step of forming the conductors is performed simultaneously with the step of forming the thin-film coil.

9. A method of manufacturing a thin-film magnetic head according to claim 5 wherein the step of forming the conductors is performed simultaneously with the step of forming the second magnetic layer.

10. A method of manufacturing a thin-film magnetic head according to claim 5 wherein the step of forming the conductors is performed after the step of forming the second magnetic layer.

11. A method of manufacturing a thin-film magnetic head sub-structure used for manufacturing a thin-film magnetic head that comprises: a main body having a first surface and a second surface facing directions opposed to each other wherein a thin-film magnetic head element is to be formed; a plurality of thin-film magnetic head element portions formed in the main body, and including at least one first thin-film magnetic head element portion having a pole tip that faces the first surface and at least one second thin-film magnetic head element portion having a pole tip that faces the second surface; a plurality of electrodes, formed in the main body, and provided for a single thin-film magnetic head element portion, each of the plurality of electrodes for electrically connecting any one of the element portions to an external device; and a plurality of conductors, formed in the main body, and electrically connecting either the at least one first thin-film magnetic head element portion or the at least one second thin-film magnetic head element portion to the electrodes, and the other of the at least one first thin-film magnetic head element portion or the at least one second thin-film magnetic head element portion is not connected to the electrodes, the method including the step of forming the at least one first thin-film magnetic head element portion and the at least one second thin-film magnetic head element portion in a section to be the main body.

12. A method of manufacturing a thin-film magnetic head sub-structure according to claim 11 wherein the at least one first thin-film magnetic head element portion and the at least one second thin-film magnetic head element portion are placed in symmetrical positions with respect to a plane parallel to the first and second surfaces in the step of forming the element portions.

13. A method of manufacturing a thin-film magnetic head sub-structure according to claim 11, further including the step of forming the electrodes.

14. A method of manufacturing a thin-film magnetic head sub-structure according to claim 11 wherein the thin-film magnetic head element portions each comprise at least part of an induction-type magnetic transducer having first and second magnetic layers magnetically connected to each other and each made up of at least one layer and including pole portions parts of which facing a recording medium are opposed to each other with a recording gap layer in between, and thin-film coil placed between the first and second magnetic layers.

15. A method of manufacturing a thin-film magnetic head sub-structure according to claim 11 wherein the thin-film magnetic head element portions each comprise a magnetoresistive element.

16. A method of manufacturing a thin-film magnetic head sub-structure according to claim 11, further including the step of forming intermediate connecting portions for the respective thin-film magnetic head element portions, the connecting portions being connected to the element portions, the conductors being selectively connected to the connecting portions.

* * * * *